(12) United States Patent
Geisler et al.

(10) Patent No.: US 9,976,714 B2
(45) Date of Patent: May 22, 2018

(54) LUMINAIRE FOR CROSSWALK, METHOD FOR MAKING, AND METHOD FOR CONTROLLING

(71) Applicant: 3M INNOVATIVE PROPERTIES COMPANY, St. Paul, MN (US)

(72) Inventors: Karl J. L. Geisler, St. Paul, MN (US); Glendon D. Kappel, Eagan, MN (US); David G. Freier, St. Paul, MN (US); Mark G. Mathews, Oakdale, MN (US); Nicholas G. Amell, Burnsville, MN (US); Scott E. Simons, Scandia, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days. days.

(21) Appl. No.: 15/303,542

(22) PCT Filed: Apr. 7, 2015

(86) PCT No.: PCT/US2015/024644
§ 371 (c)(1),
(2) Date: Oct. 12, 2016

(87) PCT Pub. No.: WO2015/160564
PCT Pub. Date: Oct. 22, 2015

(65) Prior Publication Data
US 2017/0030538 A1    Feb. 2, 2017

Related U.S. Application Data

(60) Provisional application No. 61/979,785, filed on Apr. 15, 2014.

(51) Int. Cl.
*F21S 4/00* (2016.01)
*F21V 21/00* (2006.01)
(Continued)

(52) U.S. Cl.
CPC ............ *F21S 8/083* (2013.01); *F21V 3/00* (2013.01); *F21V 3/049* (2013.01); *F21V 11/14* (2013.01);
(Continued)

(58) Field of Classification Search
CPC .... F21S 8/083; F21V 23/0407; F21V 23/005; F21V 3/00; F21V 23/04; F21V 3/049;
(Continued)

(56) References Cited

U.S. PATENT DOCUMENTS 6,045,240 A * 4/2000 Hochstein ............ B60Q 1/2696
362/249.06
6,773,135 B1 * 8/2004 Packer ...................... F21S 2/00
362/145

(Continued)

FOREIGN PATENT DOCUMENTS

EP        1512314       3/2005
KR    1020100029959    3/2010
(Continued)

OTHER PUBLICATIONS

International Search Report for PCT International Application No. PCT/US2015/024644 dated Jul. 14, 2016, 9 pages.

*Primary Examiner* — Donald Raleigh
(74) *Attorney, Agent, or Firm* — Clifton F. Richardson

(57) ABSTRACT

The present disclosure describes light delivery and distribution components of a light duct that can be used as a luminaire, such as a bollard-style luminaire that can be useful for the illumination of pedestrian crosswalks, the light engine useful in the luminaire, and methods for making the light engine and the luminaire. The present disclosure further describes methods for crosswalk illumination using the bollard-style luminaires, and methods of communication between bollard luminaires. The bollard luminaire includes (Continued)

a design that generally confines light to illuminate the crosswalk and the pedestrian in the crosswalk, such that light that could produce glare for the pedestrian and/or a driver approaching the crosswalk is minimized.

20 Claims, 12 Drawing Sheets

(51) Int. Cl.

| | | |
|---|---|---|
| F21V 1/00 | (2006.01) | |
| F21V 11/00 | (2015.01) | |
| F21S 8/08 | (2006.01) | |
| F21V 3/04 | (2018.01) | |
| F21V 11/14 | (2006.01) | |
| F21V 23/04 | (2006.01) | |
| F21V 8/00 | (2006.01) | |
| G08G 1/005 | (2006.01) | |
| F21V 3/00 | (2015.01) | |
| F21V 23/00 | (2015.01) | |
| F21W 111/023 | (2006.01) | |
| F21W 131/10 | (2006.01) | |
| F21Y 115/10 | (2016.01) | |
| F21W 111/02 | (2006.01) | |

(52) U.S. Cl.
CPC ............ *F21V 23/005* (2013.01); *F21V 23/04* (2013.01); *F21V 23/0407* (2013.01); *F21V 23/0471* (2013.01); *G02B 6/0096* (2013.01); *G08G 1/005* (2013.01); *F21W 2111/02* (2013.01); *F21W 2111/023* (2013.01); *F21W 2131/10* (2013.01); *F21Y 2115/10* (2016.08)

(58) Field of Classification Search
CPC ..... F21V 23/0471; F21V 11/14; G08G 1/005; G02B 6/0096; F21W 2111/02; F21W 2111/023; F21W 2131/10; F21Y 2115/10
See application file for complete search history.

(56) References Cited

U.S. PATENT DOCUMENTS

| | | | |
|---|---|---|---|
| 7,147,903 B2 | 12/2006 | Ouderkirk | |
| 7,578,605 B1 | 8/2009 | Mullins | |
| 8,456,325 B1 | 6/2013 | Sikora | |
| 2005/0201102 A1* | 9/2005 | Saccomanno | F21V 7/0025 362/341 |
| 2009/0290352 A1 | 11/2009 | Wu | |
| 2009/0310357 A1* | 12/2009 | Huang | F21V 7/09 362/240 |
| 2010/0320918 A1* | 12/2010 | Hudson | B65G 69/2876 315/156 |
| 2011/0063831 A1* | 3/2011 | Cook | F21S 8/02 362/235 |
| 2011/0222296 A1 | 9/2011 | Kirsten | |
| 2011/0249450 A1* | 10/2011 | Ngai | F21S 8/026 362/311.06 |
| 2012/0057350 A1 | 3/2012 | Freier | |
| 2012/0140463 A1* | 6/2012 | Kinzer | F21V 7/0091 362/231 |
| 2012/0293652 A1 | 11/2012 | Farmer | |
| 2012/0300498 A1 | 11/2012 | Cho | |
| 2013/0020955 A1 | 1/2013 | Igaki | |
| 2013/0257312 A1 | 10/2013 | Maxik | |
| 2013/0285559 A1 | 10/2013 | Aoki | |
| 2015/0233533 A1* | 8/2015 | Van Es | F21K 9/175 313/49 |
| 2016/0123547 A1 | 5/2016 | Geisler | |

FOREIGN PATENT DOCUMENTS

| | | | | |
|---|---|---|---|---|
| WO | WO 1999-18390 | | 4/1999 | |
| WO | WO 2010-010493 | | 1/2010 | |
| WO | WO 2010-075357 | | 7/2010 | |
| WO | WO 2010-111766 | | 10/2010 | |
| WO | WO 2010-113100 | | 10/2010 | |
| WO | WO2014/045164 | * | 3/2014 | ............... F21S 4/00 |
| WO | WO 2014-070495 | | 5/2014 | |
| WO | WO2014-070498 | | 5/2014 | |

* cited by examiner

LUMINAIRE FOR CROSSWALK, METHOD FOR MAKING, AND METHOD FOR CONTROLLING

BACKGROUND

The potential for greatest vehicle safety advancements are in emerging economies, and in particular rural areas of developed countries. Reduced visibility at night is a key contributor to pedestrian fatalities due to vehicle/pedestrian collisions. It is desired to improve the illumination of pedestrians in crosswalks while preventing excessive glare that may endanger both drivers and pedestrians.

SUMMARY

The present disclosure describes light delivery and distribution components of a light duct that can be used as a luminaire, such as a bollard-style luminaire that can be useful for the illumination of pedestrian crosswalks, the light engine useful in the luminaire, and methods for making the light engine and the luminaire. The present disclosure further describes methods for crosswalk illumination using the bollard-style luminaires, and methods of communication between bollard luminaires. The bollard luminaire includes a design that generally confines light to illuminate the crosswalk and the pedestrian in the crosswalk, such that light that could produce glare for the pedestrian and/or a driver approaching the crosswalk is minimized. The delivery and distribution system (i.e., light duct and light duct extractor) can function effectively with any light source that is capable of delivering light which is substantially collimated about the longitudinal axis of the light duct, and which is also preferably substantially uniform over the inlet of the light duct.

In one aspect, the present disclosure provides a method for making a luminaire that includes forming an enclosure having an enclosure output surface disposed along a longitudinal axis of the enclosure, the enclosure output surface surrounded by a flange; affixing a light engine assembly within the enclosure; affixing electronic circuitry within the enclosure; positioning a reflective light duct to accept light from the light engine, the reflective light duct having a light output region adjacent the enclosure output surface; positioning a light transmissive plate adjacent the enclosure output surface; and affixing the light transmissive plate to the flange.

In another aspect, the present disclosure provides a light engine that includes a housing having a light output aperture and an electrical connection port; a plurality of light collimating horns having an output end adjacent the light output aperture; a light emitting diode (LED) circuit board having at least one LED adjacent an input end of each of the plurality of light collimating horns; a heat sink affixed to the LED circuit board; and a light transmissive plate adjacent the light output aperture.

In yet another aspect, the present disclosure provides a method of making a light engine that includes positioning a light emitting diode (LED) circuit board into a bottom enclosure; affixing a heat-sink to the LED circuit board; folding a reflective material into at least one light collimating horn, each light collimating horn having an input end and an output end; positioning the at least one light collimating horn into the bottom enclosure such that the input end is adjacent an LED mounted on the LED circuit board; disposing a light transmissive plate into the bottom enclosure, adjacent the output end of the at least one light collimating horn; and affixing a top enclosure to the bottom enclosure, thereby enclosing the LED circuit board, a portion of the heat-sink, the at least one light collimating horn, and a portion of the light transmissive plate between the top and bottom enclosures.

In yet another aspect, the present disclosure provides a method for crosswalk illumination that includes activating a first luminaire in a network of luminaires; broadcasting an activation signal from the first luminaire; sending an echo signal from adjacent luminaires to the first luminaire; receiving an acknowledgement response from adjacent luminaires; and illuminating a light source in each of the network of luminaires.

In yet another aspect, the present disclosure provides a method for communication between bollard luminaires, comprising: joining a plurality of bollard luminaires into a network; broadcasting an activation signal from a first bollard luminaire; receiving the activation signal by adjacent bollard luminaires; echoing an acknowledgement signal from a verified network activation signal; and illuminating a light source in each of the plurality of bollard luminaires.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
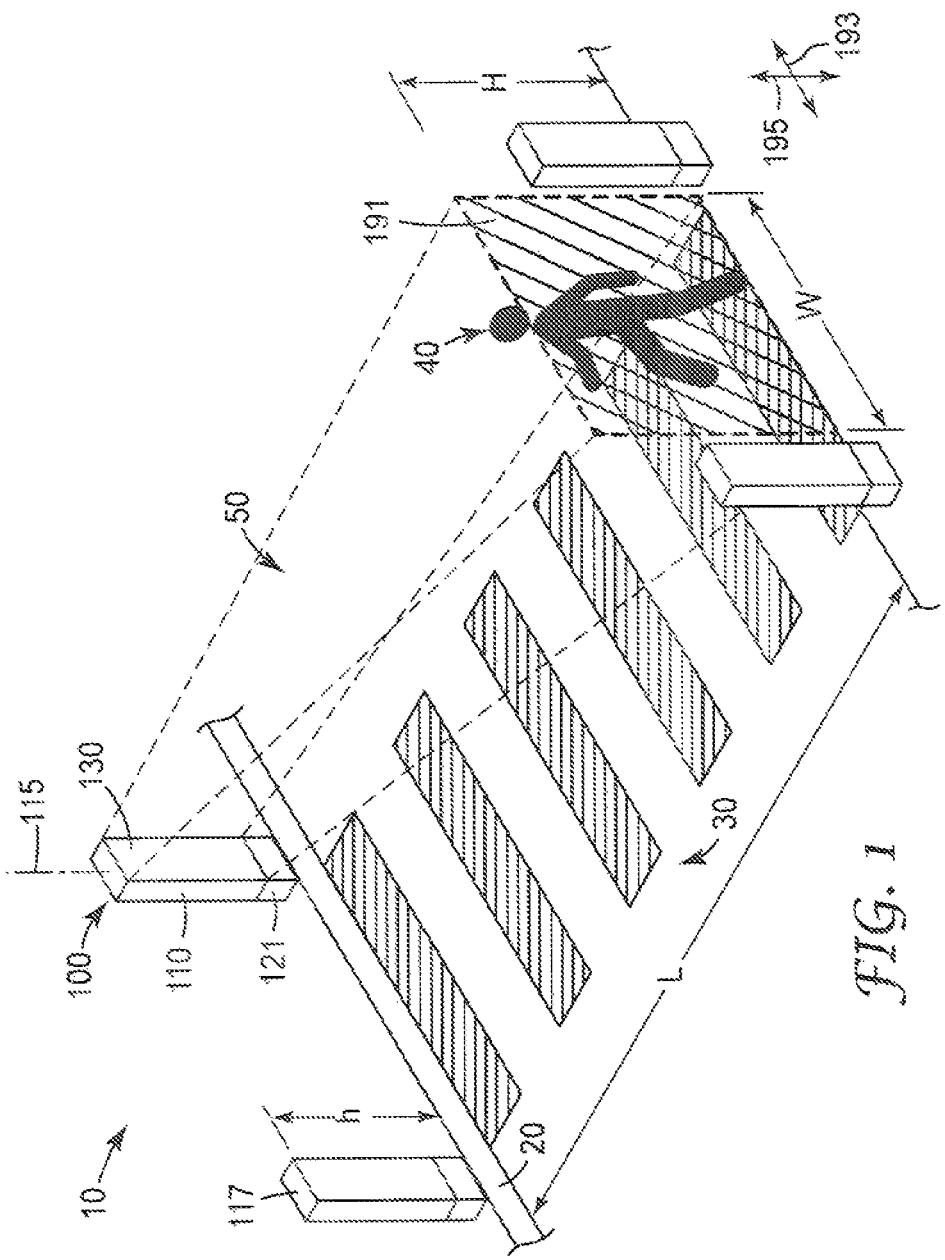
FIG. 1 shows a perspective schematic view of an illuminated pedestrian crosswalk.

The present disclosure describes light delivery and distribution components of a light duct that can be used as a luminaire, such as a bollard-style luminaire that can be useful for the illumination of pedestrian crosswalks, the light engine useful in the luminaire, and methods for making the light engine and the luminaire. The present disclosure further describes methods for crosswalk illumination using the bollard-style luminaires, and methods of communication between bollard luminaires. The described bollard-style luminaire can be a light duct positioned vertically from the sidewalk or pavement surface that provides vertical illumination of pedestrians in a crosswalk for enhanced conspicuity and minimal glare. Suitable bollard-style luminaires useful in the present invention include those described in, for example, co-pending U.S. Patent Application Ser. No. 61/829,511 entitled LUMINAIRE FOR CROSSWALK, filed on May 31, 2013.

Studies evaluating various crosswalk pedestrian illumination strategies have been conducted, and initial tests of bollard-style luminaires have been shown to be promising candidates. The disclosed bollard luminaire employs a hollow light duct having appropriately designed turning (and optionally steering) films to efficiently deliver highly-collimated light within the crosswalk area, in order to maximize visual contrast between pedestrians in the crosswalk and the background environment. The fixture may be integrated with crosswalk controls either by hardwiring the controls or by wireless addressing, and/or powered by batteries that can be charged during daylight hours by solar cells or other energy harvesting technologies, for off-grid installation such as for temporary uses, or remote installations.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Mirror-lined light ducts can efficiently deliver light from small light sources to be extracted and directed as desired to illuminate regions, such as pedestrian crosswalks. Such mirror-lined light ducts can be uniquely enabled by the use of optical films available from 3M Company, including mirror films such as Vikuiti™ ESR film, that have greater than 98% specular reflectivity across the visible spectrum of light. The design of a crosswalk illumination system takes into consideration the potential glare that can be hazardous to both pedestrians and drivers, and as such, the illumination area is preferably controlled such that minimal light is projected from the luminaire to either the pedestrian's eyes or the driver's eyes. Suitable control of light can be realized by using well-collimated light within the luminaire, and controlling the collimation and direction of light extracted from the luminaire.

Light emitting diode (LED) based lighting may eventually replace a substantial portion of the world's installed base of incandescent, fluorescent, metal halide, and sodium-vapor fixtures, and can be particularly well suited for use in remote illumination systems. One of the primary driving forces is the projected luminous efficacy of LEDs versus those of these other sources. Some of the challenges to utilization of LED lighting include (1) reduce the maximum luminance emitted by the luminaire far below the luminance emitted by the LEDs (e.g., to eliminate glare); (2) promote uniform contributions to the luminance emitted by the luminaire from every LED in the fixture (i.e., promote color mixing and reduce device-binning requirements); (3) preserve the small etendue of LED sources to control the angular distribution of luminance emitted by the luminaire (i.e., preserve the potential for directional control); (4) avoid rapid obsolescence of the luminaire in the face of rapid evolution of LED performance (i.e., facilitate updates of LEDs without replacement of the luminaire); (5) facilitate access to customization of luminaires by users not expert in optical design (i.e., provide a modular architecture); and (6) manage the thermal flux generated by the LEDs so as to consistently realize their entitlement performance without excessive weight, cost, or complexity (i.e., provide effective, light-weight, and low-cost thermal management).

When coupled to a collimated LED light source, the ducted luminaire system described herein can address challenges (1)-(5) in the following manners (challenge 6 concerns specific design of the LED lighting element):

(1) The light flux emitted by the LEDs is emitted from the luminaire with an angular distribution of luminance which is substantially uniform over the emitting area. The emitting area of the luminaire is typically many orders of magnitude larger than the emitting area of the devices, so that the maximum luminance is many orders of magnitude smaller.

(2) The LED devices in any collimated source can be tightly clustered within an array occupying a small area, and all paths from these to an observer involve substantial distance and multiple bounces. For any observer in any position relative to the luminaire and looking anywhere on the emitting surface of a luminaire, the rays incident upon your eye can be traced within its angular resolution backwards through the system to the LED devices. These traces will land nearly uniformly distributed over the array due to the multiple bounces within the light duct, the distance travelled, and the small size of the array. In this manner, an obeserver's eye cannot discern the emission from individual devices, but only the mean of the devices.

(3) The typical orders of magnitude increase in the emitting area of the luminaire relative to that of the LEDs implies a concomitant ability to tailor the angular distribution of luminance emitted by the luminaire, regardless of the angular distribution emitted by the LEDs. The emission from the LEDs is collimated by the source and conducted to the emitting areas through a mirror-lined duct which preserves this collimation. The emitted angular distribution of luminance is then tailored within the emitting surface by the inclusion of appropriate microstructured surfaces. Alternately, the angular distribution in the far field of the luminaire is tailored by adjusting the flux emitted through a series of perimeter segments which face different directions. Both of these means of angular control are possible only because of the creation and maintenance of collimation within the light duct.

(4) By virtue of their close physical proximity, the LED sources can be removed and replaced without disturbing or replacing the bulk of the lighting system.

(5) Each performance attribute of the system is influenced primarily by one component. For example, the local percent open area of the perforated ESR determines the spatial distribution of emission, and the shape of optional decollimation-film structures (also referred to herein as "steering film" structures) largely determines the cross-duct angular distribution. It is therefore feasible to manufacture and sell a limited series of discrete components (e.g., perforated ESR with a series of percent open areas, and a series of decollimation films for standard half angles of uniform illumination) that enable users to assemble an enormous variety of lighting systems.

One component of the light ducting portion of an illumination system is the ability to extract light from desired portions of the light duct efficiently, and without adversely degrading the light flux passing through the light duct to the rest of the ducted lighting system. Extraction of light from hollow light ducts is described further in, for example, co-pending U.S. Patent Application Ser. No. 61/720,118, entitled RECTANGULAR LIGHT DUCT EXTRACTION; and 61/720,124, entitled CURVED LIGHT DUCT EXTRACTION both filed Oct. 30, 2012 and included herein by reference.

For those devices designed to transmit light from one location to another, such as a light duct, it is desirable that the optical surfaces absorb and transmit a minimal amount of light incident upon them while reflecting substantially all of the light. In portions of the device, it may be desirable to deliver light to a selected area using generally reflective optical surfaces and to then allow for transmission of light out of the device in a known, predetermined manner. In such devices, it may be desirable to provide a portion of the optical surface as partially reflective to allow light to exit the device in a predetermined manner, as described herein.

Where multilayer optical film is used in any optical device, it will be understood that it can be laminated to a support (which itself may be light transmissive, opaque reflective or any combination thereof) or it can be otherwise supported using any suitable frame or other support structure because in some instances the multilayer optical film itself may not be rigid enough to be self-supporting in an optical device.

Generally, the combination of the positioning and distribution of the plurality of voids, the structured surface of the asymmetric turning film, and the structured surface of the steering film can be independently adjusted to control the direction and collimation of the light beams exiting through the light duct extractor. Control of the emission in the down-duct direction can be influenced by the distribution of the plurality of voids and the structure of the asymmetric turning film disposed adjacent the plurality of voids. Control of the emission in the cross-duct direction can also be influenced by the distribution of the plurality of voids, and the structure of the steering film disposed adjacent the asymmetric turning film. This is illustrated in FIG. 1 for a bollard luminaire and a vertical target surface. Different locations of the luminaire can illuminate different localized areas on the target surface, as described elsewhere. Tailoring the percent open area of the perforated ESR at different locations to alter the local intensity of the emitted luminance provides the means to create desired patterns of illuminance on the target surface.

FIG. 1 shows a perspective schematic view of an illuminated pedestrian crosswalk 10, according to one aspect of the disclosure. Illuminated pedestrian crosswalk 10 includes curb 20, crosswalk 30, pedestrian 40, illumination light rays 50, and at least one luminaire, such as a bollard luminaire 100 having a luminaire height "h". In FIG. 1, four bollard luminaires 100 are shown, each disposed adjacent the crosswalk 30 on the curb 20. Each of the bollard luminaires 100 can have any desired cross-sectional shape including, for example, a rectangle such as shown in FIG. 1, a circle, an ellipse, a rectangle having at least one curved surface, or any desired polygonal or curvilinear cross-sectional shape.

Bollard luminaire 100 includes a light duct 110 having a longitudinal axis 115 and a reflective inner surface surrounding a cavity. A light source 121 injects a partially collimated light beam (not shown) along the longitudinal axis 115 within the light duct 110. A portion of the partially collimated light beam can leave the light duct 110 through a light output surface 130 where light is extracted through a plurality of voids, as described elsewhere. In general, any desired number of light output surfaces can be disposed at different locations on any of the light ducts described herein.

Illumination light rays 50 leaving the light output surface 130 are directed onto an illumination region 191 adjacent crosswalk 30. The illumination region 191 can be positioned as desired along a first direction 193 perpendicular to the longitudinal axis 115 and also along a second direction 195 parallel to the longitudinal axis 115. The size and shape of the illumination region 191 can also be varied, by adjusting a distribution of voids, an asymmetric turning film, and an optional steering film (not shown) from the light duct 110, as described elsewhere. The light rays that leave the light output surface 130 can be configured to create any desired level and pattern of illumination on the illumination region 191, and generally includes an illumination height "H" and an illumination width "W" that illuminate a pedestrian in the crosswalk without producing glare in the pedestrian's eyes (or driver's eyes when approaching the crosswalk), as described elsewhere. In one particular embodiment, the bollard luminaire 100 can have the overall luminaire height "h" of about 4 feet (the top 3 feet of which is capable of emitting light), the illumination height "H" can be less than an average height of an adult pedestrian's eyes above the crosswalk, for example, about 5 feet (152 cm), and the illumination width "W" can be about the width of the crosswalk, for example, about 8 feet (244 cm).

In one particular embodiment, the partially collimated light beam (not shown) includes a cone of light having a propagation direction within a collimation half-angle from a central light ray, as described elsewhere. The divergence angle of the partially collimated light beam can be symmetrically distributed in a cone around the central light ray, or it can be non-symmetrically distributed. In some cases, the divergence angle of the partially collimated light beam can range from about 0 degrees to about 30 degrees, or from about 0 degrees to about 25 degrees, or from about 0 degrees to about 20 degrees, or even from about 0 degrees to about 15 degrees, or less than about 10 degrees. In one particular embodiment, the divergence angle of the partially collimated light beam can be less than about 10 degrees, to provide for acceptable levels of illumination glare for both pedestrians and drivers.

Partially collimated light rays are injected into the interior of the light duct along the direction of the axis of the light duct. A perforated reflective lining of the light duct (e.g., perforated 3M Enhanced Specular Reflector (ESR) film) lines a portion of the light duct. A light ray which strikes the ESR between perforations is specularly reflected and returned to the light duct within the same cone of directions as the incident light. Generally, the reflective lining of ESR is at least 98 percent reflective at most visible wavelengths, with no more than 2 percent of the reflected light directed more than 0.5 degrees from the specular direction. A light ray which strikes within a perforation (or void) passes through the ESR with no change in direction. (Note that the dimensions of the perforations within the plane of the ESR are assumed large relative to its thickness, so that very few rays strike the interior edge of a perforation.) The probability that a ray strikes a perforation and therefore exits the light duct is proportional to the local percent open area of the perforated ESR. Thus, the rate at which light is extracted from the light duct can be controlled by adjusting this percent open area.

Figure 2A:
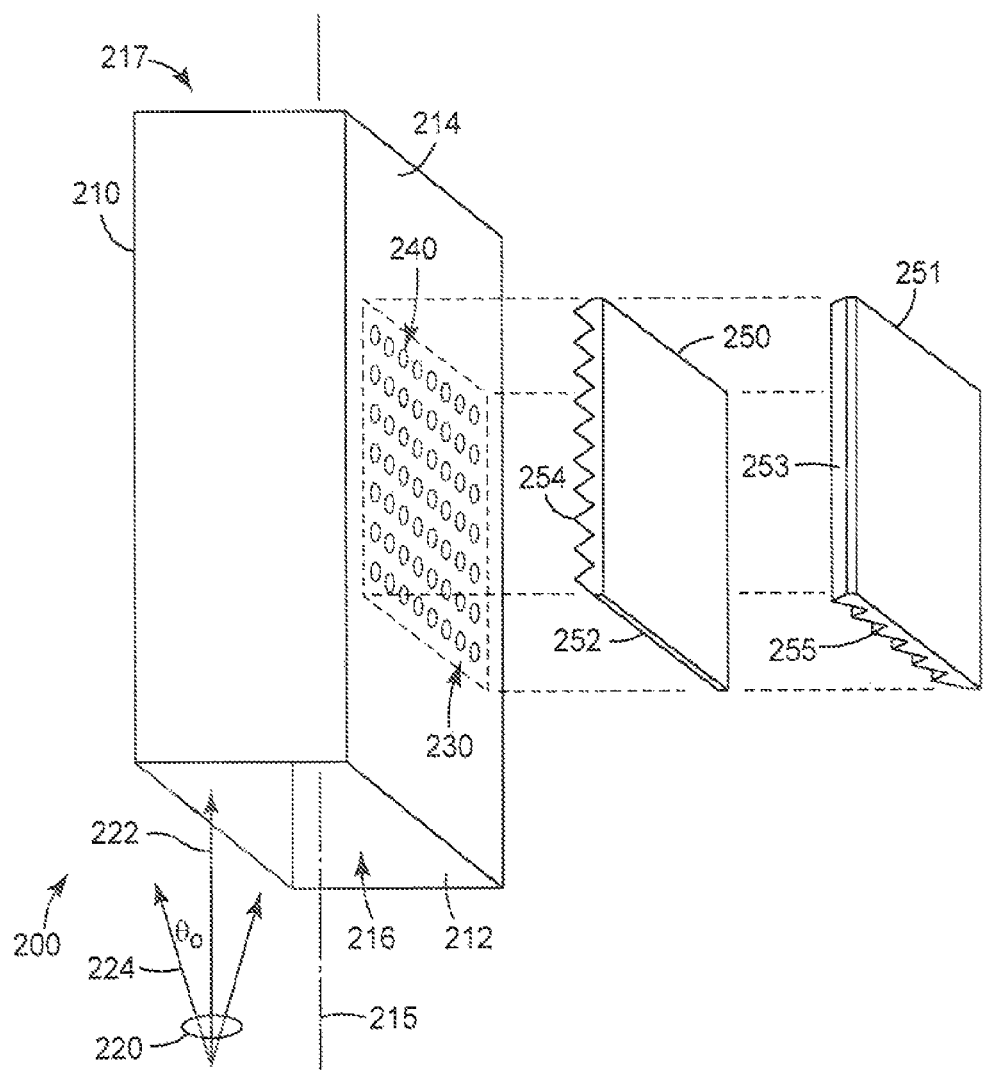
FIG. 2A shows an exploded perspective schematic view of a lighting element.

FIG. 2A shows an exploded perspective schematic view of a lighting element 200 that includes a rectangular light duct extractor, according to one aspect of the disclosure. Each of the elements 210-230 shown in FIG. 2A correspond to like-numbered elements 110-130 shown in FIG. 1, which have been described previously. For example, light duct 210 shown in FIG. 2A corresponds to light duct 110 shown in FIG. 1, and so on. Lighting element 200 includes a light duct 210 having a longitudinal axis 215, a reflective surface 212 surrounding a cavity, a light input end 216, and an opposing end 217. A partially collimated light beam 220 having a central light ray 222 and boundary light rays 224 disposed within an input collimation half-angle $\theta_0$ of the longitudinal axis 215 can be efficiently transported along the light duct 210. A portion of the partially collimated light beam 220 can leave the light duct 210 through a plurality of voids 240 disposed in the reflective surface 212 in a light output surface 230 where light is extracted. A asymmetric turning film 250 having a plurality of parallel ridged microstructures 252 is positioned adjacent the light output surface 230 such that a vertex 254 corresponding to each of the parallel ridged microstructures 252 is positioned proximate an exterior surface 214 of light duct 210. The asymmetric turning film 250 can intercept light rays exiting the cavity through one of the plurality of voids 240.

An optional steering film 251 having a plurality of parallel ridges 253 each with a steering vertex 255, is positioned adjacent the asymmetric turning film 250 and opposite the light output surface 230 of the light duct 210. Each of the plurality of parallel ridges 253 positioned parallel to the longitudinal axis 215 of light duct 210, such that each of the plurality of parallel ridges 253 can refract light rays exiting the asymmetric turning film 250 into a direction perpendicular to the longitudinal axis 215, such that a light ray that exits the cavity through the light output surface 230 is redirected into a first direction disposed within a first plane perpendicular to the light duct cross-section by the asymmetric turning film, and into a second direction within a second plane parallel to the light duct cross section by the steering film, as described elsewhere.

In one particular embodiment, each of the plurality of voids 240 can be physical apertures, such as holes that pass either completely through, or through only a portion of the thickness of the reflective surface 212. In one particular embodiment, each of the plurality of voids 240 can instead be solid clear or light transmissive regions such as windows, formed in the reflective surface 212 that do not substantially reflect light. In either case, the plurality of voids 240 designates a region of the reflective surface 212 where light can pass through, rather than reflect from the surface. The voids can have any suitable shape, either regular or irregular, and can include curved shapes such as arcs, circles, ellipses, ovals, and the like; polygonal shapes such as triangles, rectangles, pentagons, and the like; irregular shapes including X-shapes, zig-zags, stripes, slashes, stars, and the like; and combinations thereof.

The plurality of voids 240 can be made to have any desired percent open (i.e., non-reflective) area from about 5% to about 95%. In one particular embodiment, the percent open area ranges from about 5% to about 70%, or from about 10% to about 50%. In some cases, the percent open area can be about 70%. The size range of the individual voids can also vary, in one particular embodiment, the voids can range in major dimension from about 0.5 mm to about 5 mm, or from about 0.5 mm to about 3 mm, or from about 1 mm to about 2 mm.

In some cases, the voids can be uniformly distributed across the light output surface 230 and can have a uniform size. However, in some cases, the voids can have different sizes and distributions across the light output surface 230, and can result in a variable areal distribution of void (i.e., open) across the output region. The plurality of voids 240 can optionally include switchable elements (not shown) that can be used to regulate the output of light from the light duct by changing the void open area gradually from fully closed to fully open, such as those described in, for example, co-pending U.S. Patent Publication No. US2012-0057350 entitled, SWITCHABLE LIGHT-DUCT EXTRACTION.

The voids can be physical apertures that may be formed by any suitable technique including, for example, die cut, laser cut, molded, formed, and the like. The voids can instead be light transmissive windows that can be provided of many different materials or constructions. The areas can be made of multilayer optical film or any other transmissive or partially transmissive materials. One way to allow for light transmission through the areas is to provide areas in optical surface which are partially reflective and partially transmissive. Partial reflectivity can be imparted to multi-layer optical films in areas by a variety of techniques.

In one aspect, areas may comprise multi-layered optical film which is uniaxially stretched to allow transmission of light having one plane of polarization while reflecting light having a plane of polarization orthogonal to the transmitted light, such as described, for example, in U.S. Pat. No. 7,147,903 (Ouderkirk et al.), entitled "High Efficiency Optical Devices". In another aspect, areas may comprise multi-layered optical film which has been distorted in selected regions, to convert a reflective film into a light transmissive film. Such distortions can be effected, for example, by heating portions of the film to reduce the layered structure of the film, as described, for example, in PCT Publication No. WO2010075357 (Merrill et al.), entitled "internally Patterned Multilayer Optical Films using Spatially Selective Birefringence Reduction".

The selective birefringence reduction can be performed by the judicious delivery of an appropriate amount of energy to the second zone so as to selectively heat at least some of the interior layers therein to a temperature high enough to produce a relaxation in the material that reduces or eliminates a preexisting optical birefringence, but low enough to maintain the physical integrity of the layer structure within the film. The reduction in birefringence may be partial or it may be complete, in which case interior layers that are birefringent in the first zone are rendered optically isotropic in the second zone. In exemplary embodiments, the selective heating is achieved at least in part by selective delivery of light or other radiant energy to the second zone of the film.

In one particular embodiment, the asymmetric turning film 250 can be a microstructured film such as, for example, Vikuiti™ Image Directing Films, available from 3M Company. The asymmetric turning film 250 can include one plurality of parallel ridged microstructure shapes, or more than one different parallel ridged microstructure shapes, such as having a variety of included angles used to direct light in different directions, as described elsewhere.

Figure 2B:
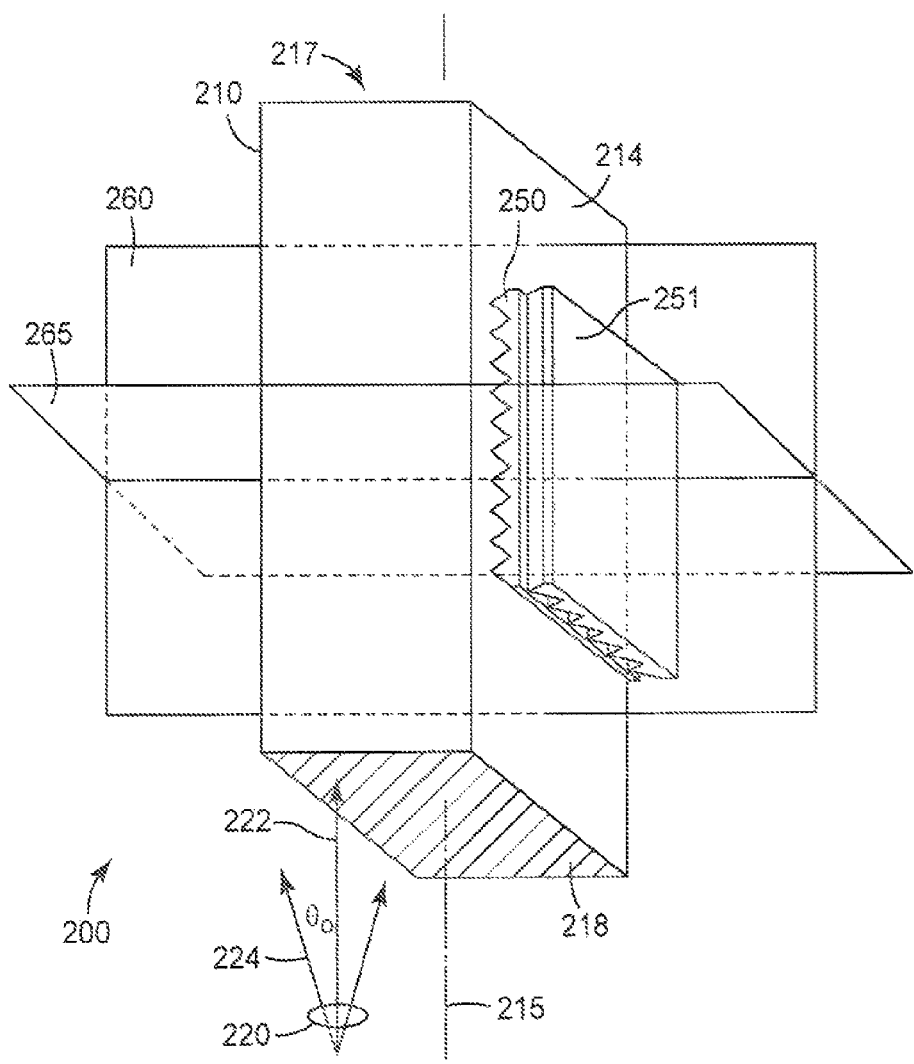
FIG. 2B shows a perspective schematic view of a lighting element.

FIG. 2B shows a perspective schematic view of the lighting element 200 of FIG. 2A, according to one aspect of the disclosure. The perspective schematic view shown in FIG. 2B can be used to further describe aspects of the lighting element 200. Each of the elements 210-250 shown in FIG. 2B correspond to like-numbered elements 210-250 shown in FIG. 2A, which have been described previously. For example, light duct 210 shown in FIG. 2B corresponds to light duct 210 shown in FIG. 2A, and so on. In FIG. 2B, a cross-section 218 of light duct 210 including the exterior 214 is perpendicular to the longitudinal axis 215, and a first plane 260 passing through the longitudinal axis 215 and the asymmetric turning film 250 is perpendicular to the cross-section 218. In a similar manner, a second plane 265 is parallel to the cross-section 218 and perpendicular to both the first plane 260 and the asymmetric turning film 250. As described herein, cross-section 218 generally includes a light output surface 230 disposed on a planar surface; in some cases, the light output surface 230 can include different planar segments of a planar-surface duct. Examples of some typical cross-section figures include triangles, squares, rectangles, pentagons, or other polygonal shapes.

The lighting element 200 further includes an optional steering film 251 disposed adjacent the asymmetric turning film 250, such that the asymmetric turning film 250 is positioned between the optional steering film 251 and the exterior 214 of the light duct 210. The optional steering film 251 is disposed to intercept light exiting from the asymmetric turning film 250 and provide angular spread of the light in a radial direction (i.e., in directions within second plane 265), as described elsewhere.

The half angle of light rays exiting the light duct in the second plane 265 is comparable to the half angle of collimation within the light duct. The half angle of light rays exiting the light duct in the first plane 260 is approximately one-half the half angle within the light duct; i.e., only half of the directions immediately interior to the ESR have the opportunity to escape through a perforation. Thus, the precision of directing the light in a desired direction increases as the half angle within the light duct decreases.

Light rays that pass through a perforation encounter the prismatic asymmetric turning film 250. The light rays strike the prisms of the asymmetric turning film 250 in a direction substantially parallel to the plane of the asymmetric turning film 250 and perpendicular to the axes of the prisms—the divergence of their incidence from this norm is dictated by the collimation within the light duct. A majority of these rays enter the film by refracting through the first prism face encountered, then undergoing total internal reflection (TIR) from the opposing face, and finally refract through the opposing planar surface of the film, as described elsewhere. The net change in direction along the axis of the light duct can be readily calculated by using the index of refraction of the asymmetric turning film prism material and the included angle of the prisms, as described elsewhere. Since most rays are transmitted, very little light is returned to the light duct, facilitating the maintenance of collimation within the light duct.

Light rays that pass through the asymmetric turning film 250 can next encounter an optional decollimation film or plate (also referred to as the optional steering film 251), as described elsewhere. The rays that encounter the optional steering film 251 strike the structured surface of this film, are refracted into directions determined by the local slope of the structure, and pass through the opposing planar surface. The net change in direction perpendicular to the longitudinal axis is determined by the index of refraction and the distribution of surface slopes of the structure, as described elsewhere. The optional steering film structure can be a smooth curved surface such as a cylindrical or aspheric ridge-like lens, or can be piecewise planar such as to approximate a smooth curved lens structure, or it can be planar. In general, the optional steering film structures are selected to yield a specified distribution of illuminance upon target surfaces occurring at distances from the light duct large compared to the cross-duct dimension of the emissive surface. In one particular embodiment, the steering film can have a "sawtooth" shaped structure that steers light from the bollard illuminator at an angle to illuminate the crosswalk from the curb of the street. The structure of this optional steering film can eliminate the need to adjust the bollard illuminator at an angle to the crosswalk, which can add to the costs and complexity of installation. Again, since most rays are transmitted through the steering film, very little light is returned to the light duct, preserving the collimation within the light duct.

In many cases the asymmetric turning film and steering film, if present, may use a light transmissive support plate or tube surrounding the light duct (depending on the light duct configuration), such as an enclosure surrounding a bollard luminaire for use in pedestrian crosswalks. In one particular embodiment, the light transmissive support can be laminated to the outermost film component, and can include an anti-reflective coating on the outermost surface. Both lamination and AR coats increase transmission through and decrease reflection from the outermost component, increasing the overall efficiency of the lighting system, and better preserving the collimation within the light duct.

Figure 2C:
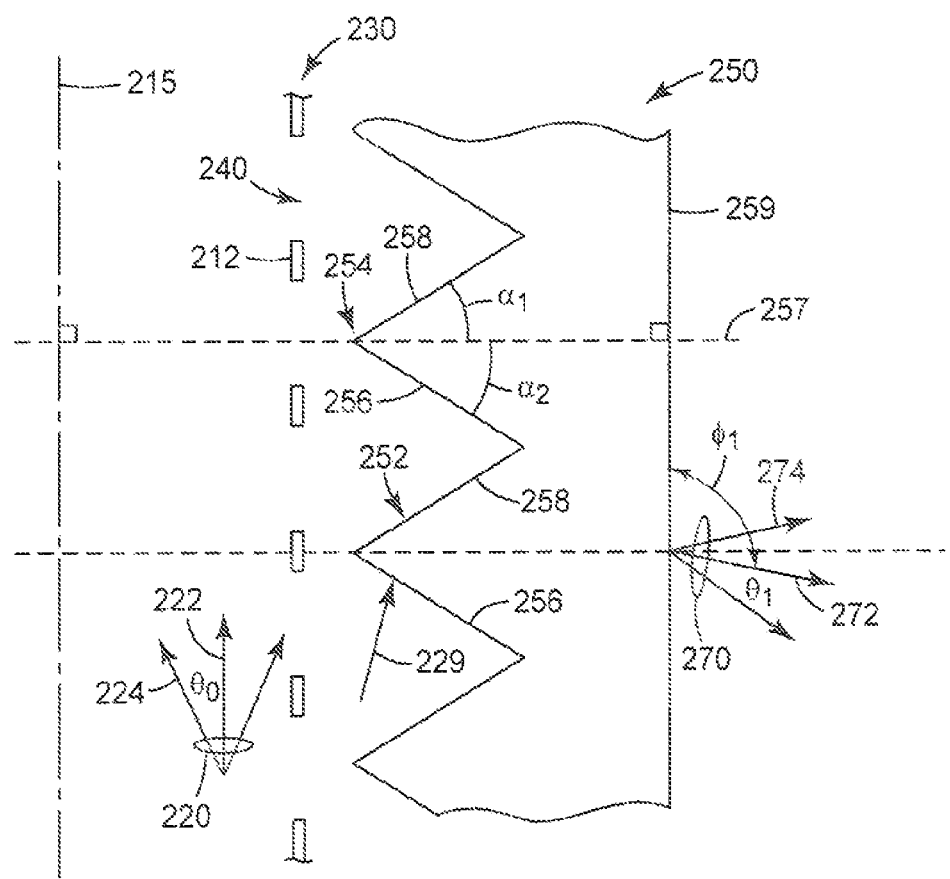
FIG. 2C shows a schematic cross sectional side view of a portion of a lighting element.

FIG. 2C shows a schematic cross sectional side view near the light output surface 230 of the lighting element 200 of FIGS. 2A and 2B, according to one aspect of the disclosure. Each of the elements 215-250 shown in FIG. 2C correspond to like-numbered elements 215-250 shown in FIG. 2B, which have been described previously. For example, longitudinal axis 215 shown in FIG. 2C corresponds to longitudinal axis 215 shown in FIG. 2A, and so on. Further, as shown in FIG. 1, the bollard luminaire 100 has a longitudinal axis 115 generally aligned vertically, and therefore generally the longitudinal axis 215 is in a vertical orientation.

A partially collimated light beam 220 having a central light ray 222 and boundary light rays 224 disposed within an input collimation half-angle $\theta_0$ of the longitudinal axis 215 can propagate down the lighting element 200 of FIGS. 2A and 2B. A portion of the partially collimated light beam 220 can leave the lighting element 200 through a plurality of voids 240 disposed in the reflective surface 212 in a light output surface 230 where light is extracted. An asymmetric turning film 250 having a plurality of parallel ridged microstructures 252 and an opposing planar surface 259, is positioned adjacent the light output surface 230 such that a vertex 254 corresponding to each of the parallel ridged microstructures 252 is positioned proximate the plurality of voids 240. The asymmetric turning film 250 is positioned to intercept and redirect light rays exiting through one of the plurality of voids 240.

The vertex 254 corresponding to each of the parallel ridged microstructures 252 has a prism angle ($\alpha 1+\alpha 2$) between a first planar face 256 and a second planar face 258 of the parallel ridged microstructures 252. In some cases, the prism angle ($\alpha 1+\alpha 2$) can vary from about 30 degrees to about 120 degrees, or from about 45 degrees to about 90 degrees, or from about 55 degrees to about 75 degrees, to redirect light incident on each of the parallel ridged microstructures 252. In one particular embodiment, the prism angle ($\alpha 1+\alpha 2$) is about 72 degrees and the partially collimated light beam 220 that exits through the plurality of voids 240 is redirected by the asymmetric turning film 250 away from the longitudinal axis 215.

The prism angle ($\alpha 1+\alpha 2$) includes a bisector 257 that is perpendicular to both the longitudinal axis 215 and the opposing second planar surface 259 of the asymmetric turning film 250. The bisector 257 divides the prism angle ($\alpha 1+\alpha 2$) into a first vertex angle $\alpha 1$ between the second surface 258 and the bisector 257, and a second vertex angle $\alpha 2$ between the first surface 256 and the bisector 257. In one particular embodiment, in order to direct the light so that glare to the pedestrian and driver are reduced, the first vertex angle $\alpha 1$ and the second vertex angle $\alpha 2$ are different angles. In some cases, the second vertex angle $\alpha 2$ (closer to the light input end 216 shown in FIGS. 2A and 2B where the partially collimated light beam 220 originates from), is larger than the first vertex angle $\alpha 1$ (closer to the opposing end 217 shown in FIGS. 2A and 2B).

A first extracted light ray 229 travelling generally from the light input end 216 (shown in FIGS. 2A and 2B) intersects first surface 256, refracts as it enters asymmetric turning film 250, reflects by total internal reflection (TIR) from second surface 258, and refracts again as it exits asymmetric turning film 250 through opposing planar surface 259. In a similar manner, a second extracted light ray (not shown), travelling generally from the opposing end 217 (shown in FIGS. 2A and 2B) intersects second surface 258, refracts as it enters asymmetric turning film 250, reflects by TIR from first surface 256, and refracts again as it exits asymmetric turning film 250 through opposing planar surface 259.

The redirected portion of the partially collimated light beam 220 exits as a partially collimated output light beam 270 having a central light ray 272 and boundary light rays 274 disposed within an output collimation half-angle $\theta_1$ and where the central light ray 272 is directed at a longitudinal angle $\phi 1$ from the longitudinal axis 215. In some cases, the input collimation half-angle $\theta_0$ and the output collimation half angle $\theta_1$ can be the same, and the collimation of light is retained. In one particular embodiment, the longitudinal angle $\phi 1$ is greater than about 90 degrees, such that the majority of the light generally remains below the horizontal plane and is prevented from producing glare that may impact the vision of either the pedestrian or the driver. The longitudinal angle $\phi 1$ is such that the central light ray 272 does not cross the bisector 257, and therefore also does not cross a plane passing through the opposing end 217 of the lighting element 200. The longitudinal angle $\phi 1$ from the longitudinal axis can vary from greater than about 90 degrees to about 135 degrees, or from greater than about 95 degrees to about 120 degrees, or from greater than about 90 degrees to about 105 degrees, depending on the included angle of the microstructures.

Figure 2D:
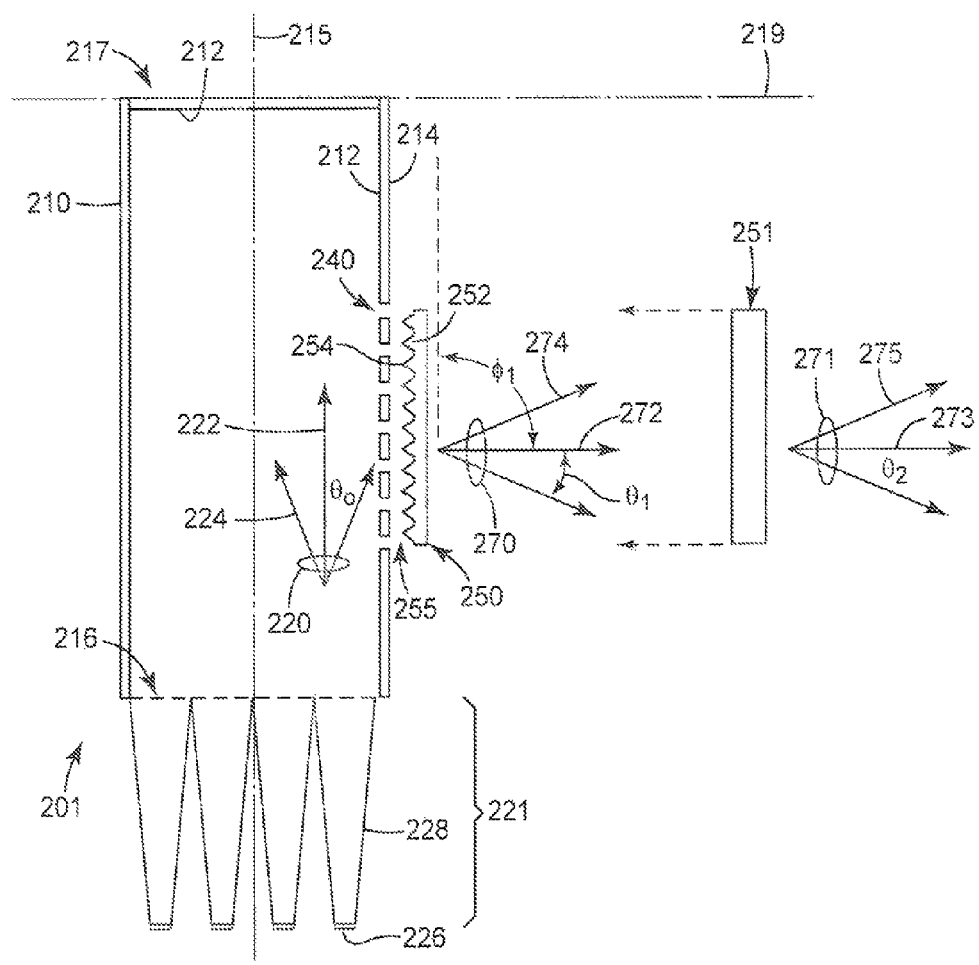
FIG. 2D shows a cross-sectional schematic side view of a luminaire.

FIG. 2D shows a cross-sectional schematic side view of a luminaire 201, such as a bollard luminaire, according to one aspect of the disclosure. Luminaire 201 can include a cross-section of the lighting element 200 of FIG. 2B, along the first plane 260. Each of the elements 210-250 shown in FIG. 2C correspond to like-numbered elements 210-250 shown in FIG. 2B, which have been described previously. For example, light duct 210 shown in FIG. 2D corresponds to light duct 210 shown in FIG. 2B, and so on. Luminaire 201 includes a light duct 210 and a light source 221 disposed to inject a light beam into the light duct 210 through a light input end 216. Light source 221 includes one or more lighting elements 226 and collimation horns 228 that serve to partially collimate the light, as described elsewhere. In one particular embodiment, lighting elements 226 can be LED sources.

Luminaire 201 includes the light duct 210 having a longitudinal axis 215, a reflective surface 212 surrounding a cavity, the light input end 216 and an opposing end 217. In some cases, the opposing end 217 can be a reflective end and include reflective surface 212. In some cases, the opposing end 217 can instead include a second light source (not shown), disposed to inject a light beam into the opposing end 217 toward the light input end 216.

A partially collimated light beam 220 having a central light ray 222 and boundary light rays 224 disposed within an input collimation half-angle $\theta_0$ of the longitudinal axis 215 can be efficiently transported along the light duct 210 from light input end 216 toward opposing end 217. A portion of the partially collimated light beam 220 can leave the light duct 210 through a plurality of voids 240 disposed in the reflective surface 212 in a light output surface 230 where light is extracted. An asymmetric turning film 250 having a plurality of parallel ridged microstructures 252 is positioned adjacent the light output surface 230 such that a vertex 254 corresponding to each of the parallel ridged microstructures 252 is positioned proximate an exterior surface 214 of light duct 210. In one particular embodiment, each vertex 254 can be immediately adjacent the exterior surface 214; however, in some cases, each vertex 254 can instead be separated from the exterior surface 214 by a separation distance 255. The asymmetric turning film 250 is positioned to intercept and redirect light rays exiting the cavity through one of the plurality of voids 240, and has been described elsewhere, for example with reference to FIG. 2C.

The redirected portion of the partially collimated light beam 220 exits as a partially collimated output light beam 270 having a central light ray 272 and boundary light rays 274 disposed within an output collimation half-angle $\theta_1$ and where the central light ray 272 is directed at a longitudinal angle $\phi 1$ from the longitudinal axis 215. In some cases, the input collimation half-angle $\theta_0$ and the output collimation half angle $\theta_1$ can be the same, and the collimation of light is retained. In one particular embodiment, the longitudinal angle $\phi 1$ is greater than about 90 degrees, such that the majority of the light generally remains below the horizontal plane and is prevented from producing glare that may impact the vision of either the pedestrian or the driver. The longitudinal angle $\phi 1$ is such that the central light ray 272 does not cross the bisector 257 shown in FIG. 2C, and therefore also does not cross a plane passing through the opposing end 217 of the lighting element 200. The longitudinal angle $\phi 1$ from the longitudinal axis can vary from greater than about 90 degrees to about 135 degrees, or from greater than about 95 degrees to about 120 degrees, or from greater than about 90 degrees to about 105 degrees, depending on the included angle of the microstructures.

An optional steering film 251 is positioned adjacent the asymmetric turning film 250 and opposite the light output surface 230 of the light duct 210 to intercept and refract the partially collimated output light beam 270. The partially collimated output light beam 270 exits the optional steering film 251 as a partially collimated steered light beam 271 having a central steered light ray 273 and boundary steered light rays 275 disposed within a steered collimation half-angle $\theta_2$, as described elsewhere.

Figure 2E:
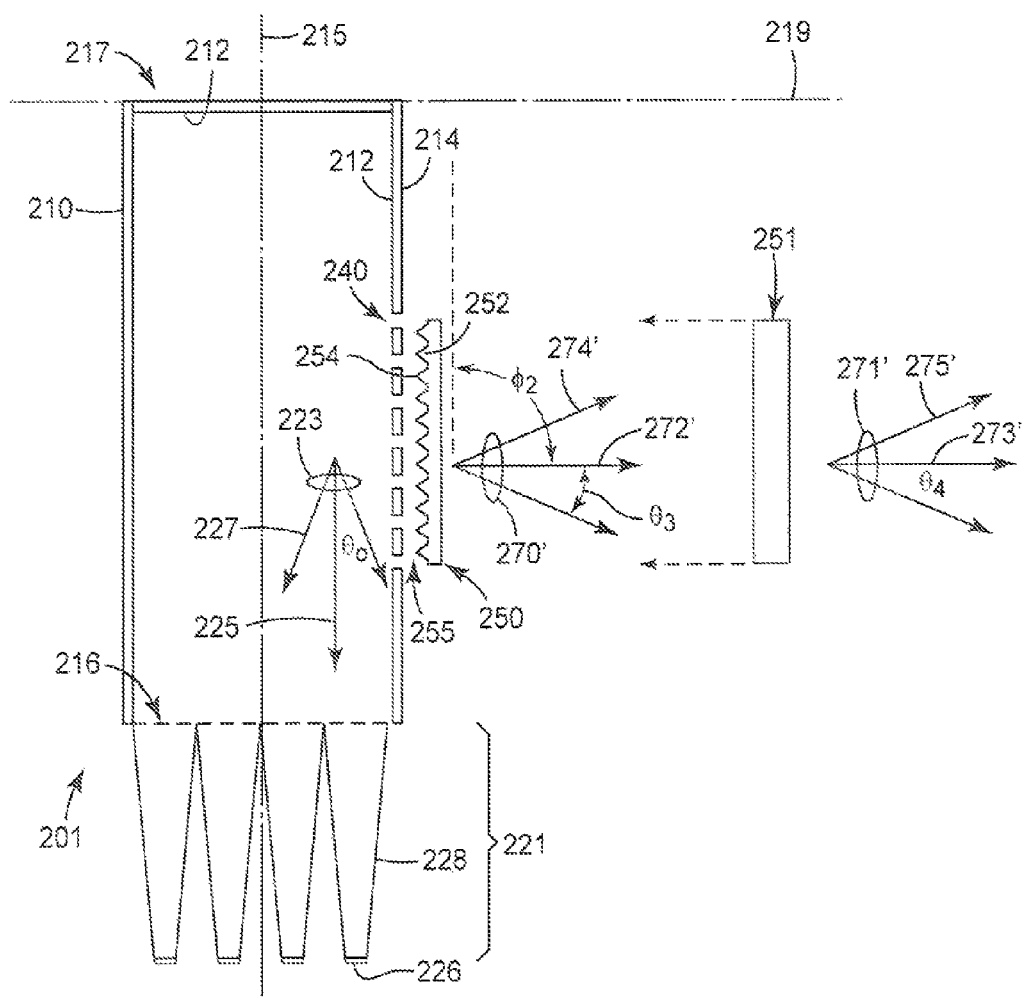
FIG. 2E shows a cross-sectional schematic side view of a luminaire.

FIG. 2E shows a cross-sectional schematic side view of the luminaire 201 shown in FIG. 2D, according to one aspect of the disclosure. Each of the elements 210-250 shown in FIG. 2E correspond to like-numbered elements 210-250 shown in FIG. 2D, which have been described previously. For example, light duct 210 shown in FIG. 2E corresponds to light duct 210 shown in FIG. 2D, and so on. In FIG. 2E, the portion of the partially collimated light beam 220 that reaches the opposing end 217 having reflective surface 212, is reflected back toward the light input end 216 as a partially collimated second light beam 223 having a central second light ray 225 and boundary second light rays 227 disposed within the input collimation half-angle $\theta_0$ of the longitudinal axis 215.

A portion of the partially collimated second light beam 223 can leave the light duct 210 through the plurality of voids 240 disposed in the reflective surface 212 in the light output surface 230 where light is extracted. The redirected portion of the partially collimated second light beam 223 exits as a partially collimated output second light beam 270' having a central second light ray 272' and boundary second light rays 274' disposed within an output collimation half-angle $\theta_3$ and where the central second light ray 272' is directed at a longitudinal angle $\phi 2$ from the longitudinal axis 215. In some cases, the input collimation half-angle $\theta_0$ and the output collimation half angle $\theta_3$ can be the same, and the collimation of light is retained. In one particular embodiment, the longitudinal angle $\phi 2$ is greater than about 90 degrees, such that the majority of the light generally remains below the horizontal plane and is prevented from producing glare that may impact the vision of either the pedestrian or the driver. The longitudinal angle $\phi 2$ is such that the central second light ray 272' does not cross the bisector 257 shown in FIG. 2C, and therefore also does not cross a plane passing through the opposing end 217 of the lighting element 200. The longitudinal angle $\phi 2$ from the longitudinal axis can vary from greater than about 90 degrees to about 135 degrees, or from greater than about 95 degrees to about 120 degrees, or from greater than about 90 degrees to about 105 degrees, depending on the included angle of the microstructures.

An optional steering film 251 is positioned adjacent the asymmetric turning film 250 and opposite the light output surface 230 of the light duct 210 to intercept and refract the partially collimated output light beam 270'. The partially collimated output light beam 270' exits the optional steering film 251 as a partially collimated steered light beam 271' having a central steered light ray 273' and boundary steered light rays 275' disposed within a steered collimation half-angle $\theta_4$, as described elsewhere.

Figure 2F:
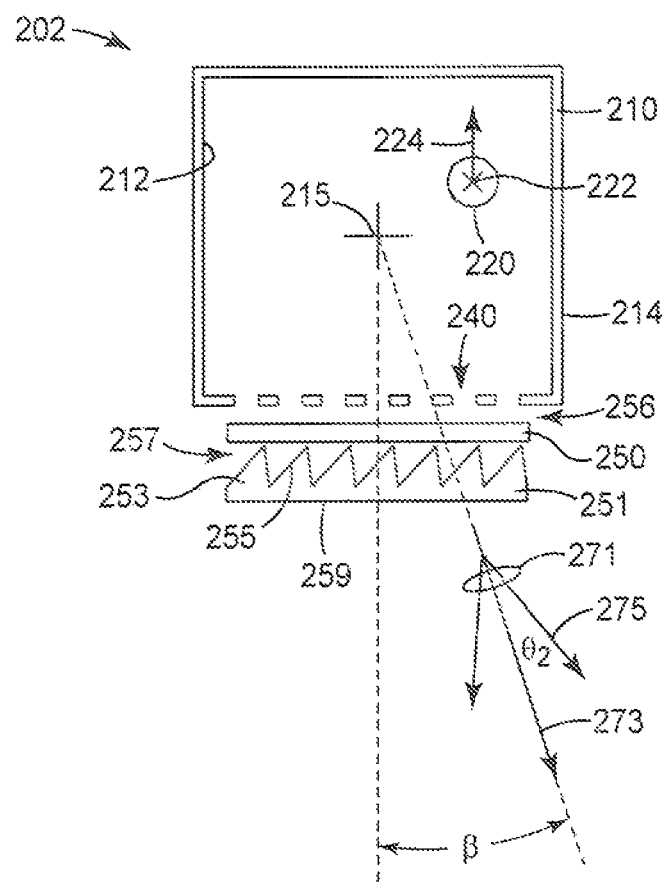
FIG. 2F shows a cross-sectional schematic view of a luminaire.

FIG. 2F shows a cross-sectional schematic view of a luminaire 202, such as a bollard luminaire, according to one aspect of the disclosure. Luminaire 202 can be a cross-section of the lighting element 200 of FIG. 2B, along the second plane 265. Each of the elements 210-250 shown in FIG. 2F correspond to like-numbered elements 210-250 shown in FIG. 2B, which have been described previously. For example, longitudinal axis 215 shown in FIG. 2F corresponds to longitudinal axis 215 shown in FIG. 2B, and so on.

Luminaire 202 includes a light duct 210 having a longitudinal axis 215 and a reflective surface 212 surrounding a cavity. A partially collimated light beam 220 having a central light ray 222 and boundary light rays 224 disposed within an input collimation half-angle $\theta_0$ of the longitudinal axis 215 can be efficiently transported along the light duct 210, shown directed into the paper as shown in FIG. 2F. A portion of the partially collimated light beam 220 can leave the light duct 210 through a plurality of voids 240 disposed in the reflective surface 212 where light is extracted. An asymmetric turning film 250 is positioned adjacent the plurality of voids 240 as described with reference to FIG. 2A-2D. The asymmetric turning film 250 is positioned to intercept and redirect light rays exiting the cavity through one of the plurality of voids 240, such that the redirection of light rays occurs in first plane 260 that passes through longitudinal axis 215. In one particular embodiment, the asymmetric turning film 250 does not influence the path of light rays within the second plane 265 perpendicular to the longitudinal axis.

The path of light rays within the second plane 265, i.e. in radial directions about the longitudinal axis 215, is influenced by an optional steering film 251. The optional steering film 251 includes a planar output surface 259 and plurality of parallel ridges 253 each with a steering vertex 255, positioned adjacent the asymmetric turning film 250 and opposite the light output surface 230 of the light duct 210. In one particular embodiment, each steering vertex 255 can be immediately adjacent the asymmetric turning film 250; however, in some cases, each steering vertex 255 can instead be separated from the asymmetric turning film 250 by a separation distance 257.

Each of the plurality of parallel ridges 253 can be positioned parallel to the longitudinal axis 215 of light duct 210, such that each of the plurality of parallel ridges 253 can refract light rays exiting the asymmetric turning film 250 into a direction perpendicular to the longitudinal axis 215, such that a light ray that exits the cavity through the light output surface 230 is redirected into a first direction disposed within a first plane perpendicular to the light duct cross-section by the asymmetric turning film, and into a second direction within a second plane parallel to the light duct cross section by the optional steering film.

In one particular embodiment, the partially collimated output light beam 270 from the asymmetric turning film enters the optional steering film 251 and then exits as a partially collimated steered light beam 271 having a central steered light ray 273 and boundary steered light rays 275 disposed within a steered collimation half-angle $\theta_2$. A first component of the central steered light ray 273 is directed within the second plane 265 in a second direction at a radial angle β from the first plane 260. A second component of the central steered light ray 273 is directed within the first plane 260 in a first direction at a longitudinal angle φ from the longitudinal axis. In some cases, each of the input collimation half-angle $\theta_0$, the output collimation half angle $\theta_1$, and the steered collimation half-angle $\theta_2$ can be the same, and the collimation of light is retained. The radial angle β around the longitudinal axis can vary from about 0 degrees to about ±45 degrees, or from about 0 degrees to about ±30 degrees, or from about 0 degrees to about ±10 degrees, of the light duct 210. As shown in FIG. 1, the radial angle β around the longitudinal axis 115 can be used to direct the light to the crosswalk without changing the angle that the bollard luminaire 100 makes with the curb 20, so that installation of the bollard luminaire 100 can be simplified.

Generally, the half angle in the along-duct direction of the emission through any lighting element of the form depicted in FIGS. 2A-2F is approximately one-half the half angle of the collimation within the light duct, since typically only one-half of the rays within the cone of rays striking the void will exit the light duct. In some cases, it can be desirable to increase the half angle in the along-duct direction without altering the angular distribution emitted in the cross-duct direction. Increasing the half angle in the along-duct direction will elongate the segment of the emissive surface which makes a substantive contribution to the illuminance at any point on a target surface. It generally is not acceptable to increase the half angle along the light duct by simply increasing the half angle within the light duct, as this would alter the cross-duct distribution and ultimately degrade the precision of cross-duct control.

For example, the along-duct distribution is centered approximately about normal for index-1.6, 69-degree turning prisms. It is centered about a direction with a small backward component (relative to the sense of propagation within the light duct) for included angles less than 69 degrees, and about a direction with a forward component for included angles greater than 69 degrees. Thus, a asymmetric turning film composed of prisms with a plurality of included angles, including some less than 69 degrees and some greater than 69 degrees, can produce an along-duct distribution approximately centered about normal, but possessing a larger along-duct half angle than a film composed entirely of 69-degree prisms.

In one particular embodiment, a method of assembling a luminaire, and a description of the various internal components is described in FIGS. 3A-3E. In each of FIGS. 3A-3E, each of the elements 300-330 correspond to like-numbered elements 100-130 shown in FIG. 1, and also elements 200-230, which have been described previously. For example, light output surface 330 shown in FIG. 3A corresponds to light output surface 130 shown in FIG. 1, and so on.

Figure 3A:
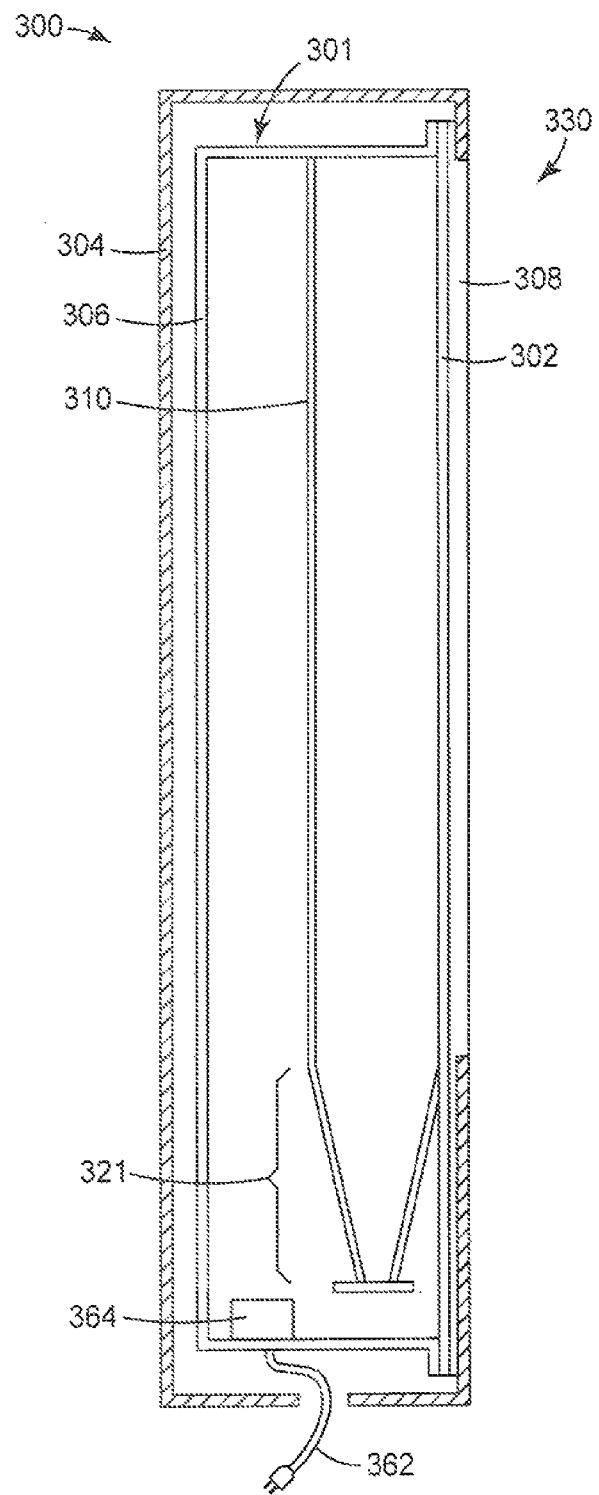
FIG. 3A shows a cross-sectional schematic side view of a luminaire.
Figure 3B:
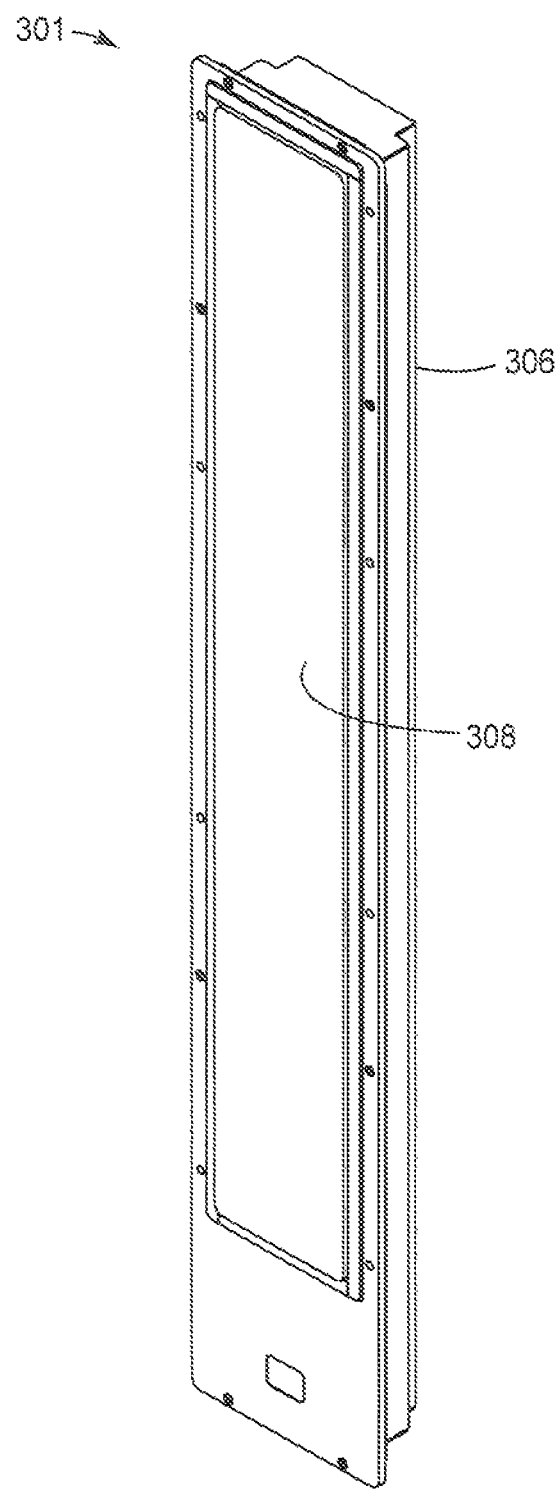
FIG. 3B shows a perspective view of a luminaire element.

FIG. 3A shows a cross-sectional schematic side view of a bollard luminaire 300, according to one aspect of the disclosure. Bollard luminaire 300 includes a bollard enclosure 304 surrounding and providing environmental protection for a luminaire element 301 disposed within the bollard enclosure 304. In some cases, the bollard enclosure 304 can be constructed from sheet metal, cast metal, extruded metal, engineering plastics, engineered composites such as fiber reinforced plastics, and the like, such as are suitable for traffic control environments. The bollard enclosure 304 further includes a light output surface 330 having light management films 302, where light leaving the luminaire element 301 through a light transmissive front plate 308 is directed to the desired illumination region (e.g., illumination region 191 as shown in FIG. 1), as described elsewhere. Luminaire element 301 further includes a luminaire enclosure 306, and an external power and control connector 364 that passes through the luminaire enclosure 306 to accept a cable 362 for connecting to an external power source and optional control device (e.g., push button, switch, or proximity sensor, not shown). Cable 262 can pass through the bollard enclosure 304 of the luminaire element 301. Luminaire element 301 further includes a light duct 310 having a reflective interior surface, for distributing light from a light engine 321 located near an end of the light duct 310, as described elsewhere. FIG. 3B shows a perspective view of a luminaire element 301, according to one aspect of the disclosure, showing luminaire enclosure 306 and light transmissive front plate 308. Luminaire element 301 can be environmentally sealed for protection of the optical and electronic elements included within.

Figure 3C:
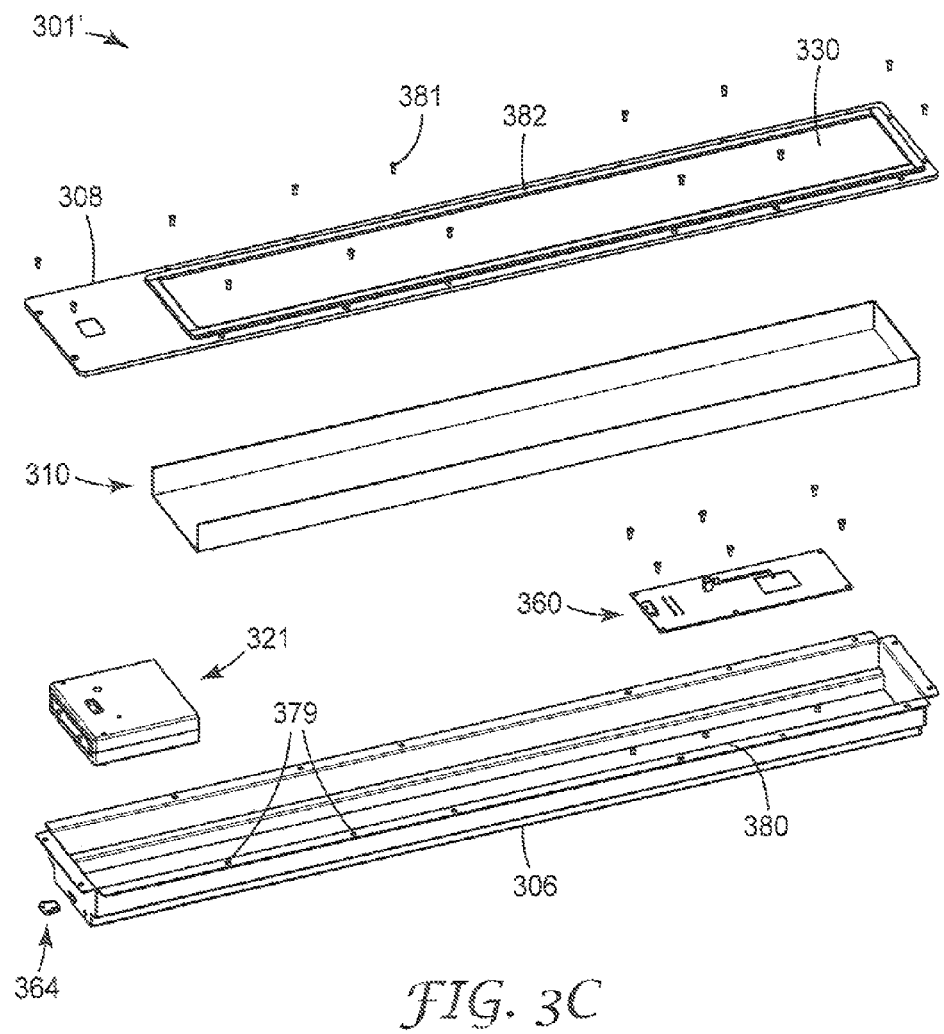
FIG. 3C shows an exploded perspective view of the luminaire element of FIG. 3B.

FIG. 3C shows an exploded perspective view of the luminaire element 301' of FIG. 3B, according to one aspect of the disclosure. The bulk of a luminaire enclosure 306 can be constructed from a folded sheet metal piece. When combined with a light transmissive front plate 308 that may have optional sealing gasket 382 applied to one or both major surfaces thereof, the contents of the luminaire element 301' are contained within the luminaire element 301' and protected from the environment. The light transmissive front plate 308 can include a recessed groove for placing a sealing gasket 382. The gasket can prevent moisture and other materials from getting into the bollard enclosure 304. The groove can be designed so that with the edge of the front plate flush against the interior of the bollard enclosure 304, the sealing gasket 382 will be compressed approximately 50%. This provides a tight seal with a hard mechanical stop to align the luminaire element 301' properly with respect to the bollard enclosure 304. The external surface of the front plate can be profiled so that it protrudes into the opening of the bollard enclosure 304, to be flush with the external surface. In some cases, a second recessed groove and a second sealing gasket (not shown) can also be provided on the opposing major surface of the light transmissive front plate 308 to provide for sealing the interior components of the luminaire element 301' from the environment.

The luminaire enclosure 306 could alternately be largely formed from an aluminum extrusion, or a folded or injection-molded plastic. The luminaire enclosure 306 includes a flange 380 to attach the light transmissive front plate 308, a light duct 310 having a reflective interior surface, and a channel to house a microcontroller/antenna circuit board 360 along with cable harnesses or other wiring (not shown) to provide electrical connection between the microcontroller/antenna circuit board 360, a light engine 321, and an external power & control connector 364. The luminaire enclosure 306 includes a plurality of connectors 379, such as, for example "PEM" nuts, for connecting the various components, including securing the luminaire enclosure 306 to the light transmissive front plate 308 and also to the bollard enclosure 304 (shown in FIG. 3A) using fasteners 381, such as, for example machine screws. The luminaire enclosure 306 includes the plurality of connectors 379 for securing the microcontroller/antenna circuit board 360 and an external earth grounding wire to the luminaire enclosure 306.

The luminaire element 301' could be mounted in the bollard enclosure 304 with the light engine 321 positioned at the top or the bottom of the bollard enclosure 304. In some cases, for the best wireless performance, the antenna should be located near the top of the bollard enclosure 304, and for ease of connection, the external power & control connector 364 should be located at the bottom of the bollard. As described herein, these features describe the luminaire element 301' oriented with the light engine 321 located at the bottom; however, it is to be understood that the light engine 321 can also be located at the top, or even at both the bottom and the top. This would allow the controller board and LED board to be combined together while keeping the antenna near the top of the bollard, as well as elevating the electronics to protect them from potential water damage or trapped debris. In some cases, the light engine and controller board could be combined into a single board if the design allows.

In addition to providing much of the mechanical structure of the luminaire element 301', the luminaire enclosure 306 can also perform as the heat sink for waste heat generated by the LEDs and driver circuitry located within the light engine 321, as described elsewhere. The luminaire enclosure 306 also can serve as a portion of the fire enclosure (in part compensating for the relatively large light output surface 330 in the front of the bollard enclosure 304) for the power components contained within bollard enclosure 304 (not shown, but external to the luminaire element 301').

A small opening (not shown) can be included in the back of both the bollard enclosure 304 and the luminaire enclosure 306, to provide access to switches mounted on the back of the microcontroller circuit board for setting various control options (e.g., light level, ON time after button press, wireless master/slave & group identification, and the like). The microcontroller board may be configured to leverage these switches for other configuration settings as well (e.g., ON/OFF blinking pattern).

The light transmissive front plate 308 supports light management films 302 that include, for example, a perforated ESR film (such as described with reference to FIGS. 2A-2F) having a plurality of voids 240 disposed in the reflective surface, a turning film 250, and optional steering film 251, as well as any other protective films and/or coatings, as described elsewhere. In one particular embodiment, a UV absorbing film (such as 3M Renewal Energy Division PR-90 window film) can be used to protect the microstructured films and the ESR film within the bollard luminaire 300 from UV exposure. In some cases, an anti-graffiti film (such as 3M Commercial Graphics Division #8991) can also be used on the exterior surface to provide cleanability, physical damage resistance, and additional UV blocking. Other films can also be applied to the light transmissive front plate 308 for various reasons: color filters, illuminated logos, other graphics, and the like.

In some cases, the turning film 250 can include a 37 degrees vertex angle proximate the light source, and a 35 degree vertex angle proximate the opposing end, as described elsewhere. In some cases, a turning film 250 having angles of 39 degrees and 34 degrees, respectively, can be used in order to increase illumination on the road surface (e.g., crosswalk 30 shown in FIG. 1) which is a feature that has been found is desirable to end users.

In one particular embodiment, a "dual plate" design can be used, where the light transmissive front plate 308 closes off the luminaire enclosure 306 and supports at least a subset of the light management films 302, but does not serve as an exterior surface of the bollard. A second light transmissive plate (not shown) may then be mounted in and sealed to the bollard enclosure 304, for example to prevent water ingress and the like. This approach can include the benefits of making the luminaire element 301' more like a replaceable lamp, and would facilitate use in fixtures having somewhat different shapes or constructions. The luminaire element 301' could be mounted at various angles relative to the second light transmissive plate (e.g., angled in both the vertical and/or horizontal directions) to further tailor the angular distribution of light emission without changing the external orientation or appearance of the bollard luminaire 300. Interior mounting features could be made adjustable for fine tuning of these angles during installation.

The light duct 310 having a reflective interior surface can be formed using a die- or laser-cut insert fabricated from a metal sheet such as aluminum, or a plastic sheet such as polystyrene, that includes a highly reflective material such as ESR on an interior surface. In one particular embodiment, the light duct 310 can be fabricated from ESR-clad polystyrene. The sheet can be scored along the edges to facilitate folding into the desired shape. Other materials besides polystyrene can be used; generally, any non-conductive material that is transmissive with respect to RF signals, can support the ESR film, and hold its shape would suffice.

The microcontroller/antenna circuit board 360 can include a transceiver for sending and receiving signals to and from neighboring units having the same wireless group ID. This board can also include connections for an optional pedestrian push button (not shown, e.g., traffic control standard 18 VDC momentary push button). For example, when a button is pressed on one of the bollard luminaires in a group, that bollard broadcasts a message to all bollards with that valid group ID. Each bollard sends back acknowledgement (or ACK) signals to the broadcasting bollard as it receives the broadcast message. If one or more bollards in the group cannot be reached by the first message, the first bollard can coordinate message-routing through the bollards that are available. Once all the bollards have acknowledged the broadcast, all of the bollards may flash a few times to indicate to oncoming traffic that a pedestrian is waiting to cross. Then, all bollards may turn on (e.g., a constant, steady light) for a time period that has been predetermined as sufficient for pedestrians to cross safely. At the end of this period, the bollards may again flash a few times to indicate the light is about to turn off. An additional button press during the ON time can reset the timer, but may not necessarily trigger a new set of initial flashes. The microcontroller board can be configured to provide power to an external 18 VDC momentary push button or simply detect changes in state of an externally-powered button.

In one particular embodiment, messages sent between bollards via the wireless communication system are encrypted. Having separate LED/driver and control/communications boards facilitates a modular approach to product design. Control features and wireless communications capabilities can be installed for some product offerings (value-added) and not installed for others (external or no control).

Figure 3D:
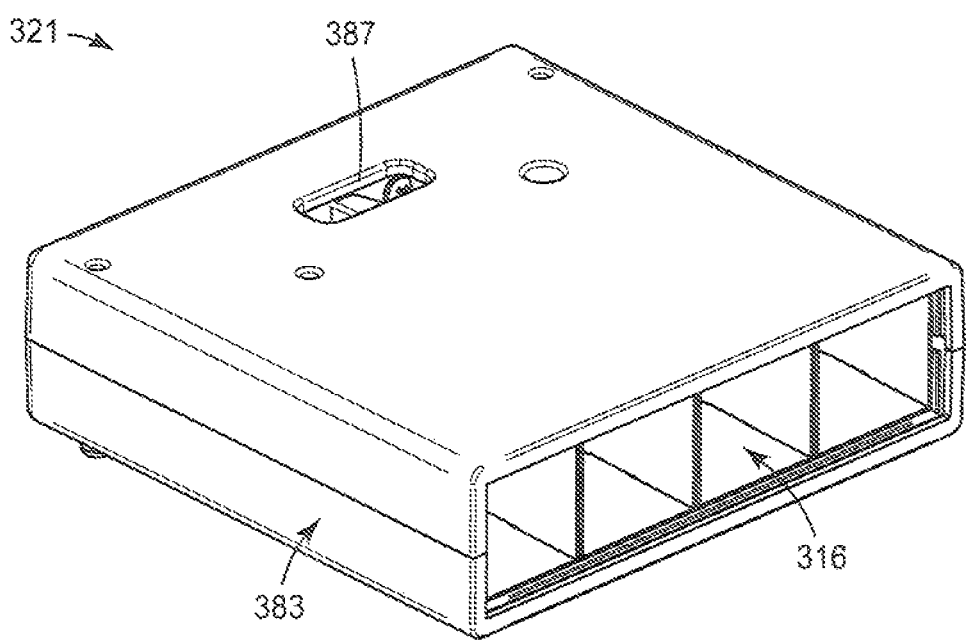
FIG. 3D shows a perspective view of a light source for a luminaire.
Figure 3E:
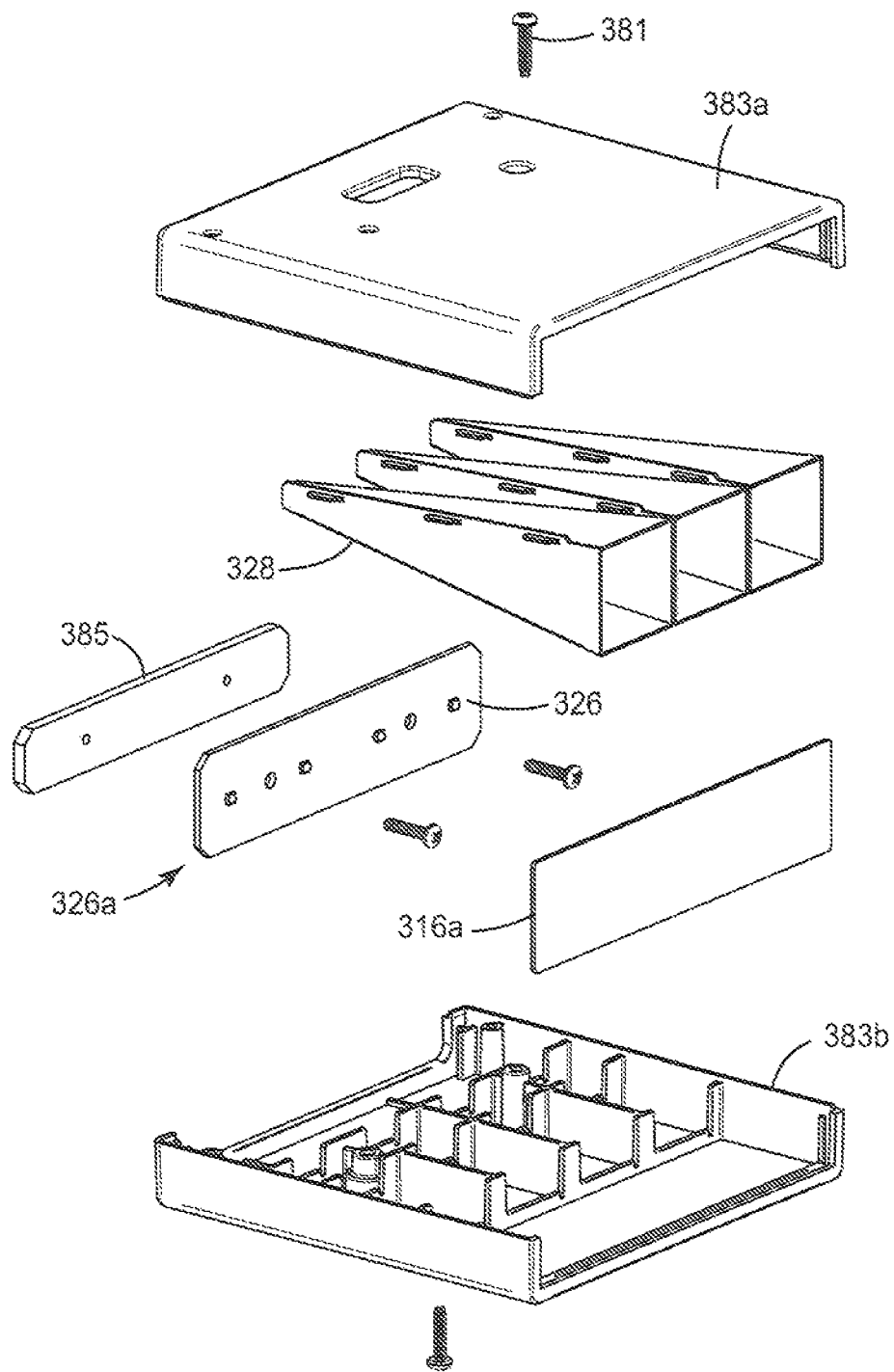
FIG. 3E shows an exploded perspective view of the light source of FIG. 3D.

FIG. 3D shows a perspective view of a light engine 321 for a luminaire element 300, 301', according to one aspect of the disclosure. Light engine 321 includes a light engine enclosure 383, an electrical connection port 387, and a light output aperture 316. FIG. 3E shows an exploded perspective view of the light engine 321 of FIG. 3D. Light engine 321 includes a plurality of collimating horns 328, where each individual horn can be fabricated from a metal sheet such as aluminum, or plastic sheet such as polystyrene, that includes a highly reflective material such as ESR on an interior surface. In one particular embodiment, the collimating horns 328 can be fabricated from ESR-clad polystyrene. The collimating horns 328 can be scored along the fold lines, and tabs can be included to help keep the mating edges of each collimating horn together. An LED circuit board 326a including individual LED 326 capable of being positioned at the input end of each of the collimating horns 328, includes driver components and circuitry for powering the LEDs, typically using a 12 VDC constant voltage power input. The LED circuit board 326a has connections for external control signals (either PWM or analog DC voltage) to adjust the light level, accessible through the electrical connection port 387.

In some cases, the LED circuit board 326a can be constructed in 2 separate halves, for example, in a 4 LED system, 2 of the 4 LEDs can be driven by one driver circuit, while the other 2 can be driven by a separate, but possibly identical, driver (all contained on the same printed circuit board with a common 12 VDC input and control signal contacts). This dual-driver technique may provide some level of redundancy to the system in case either an LED or a driver component fails; however, operation would continue at only half-brightness. The brightness of the light engine can be adjusted for the amount of ambient light and the road width, either manually by using switches, or automatically using sensors.

A light engine enclosure 383 can include two separate halves 383a, 383b, held together by connectors 381 and formed from injection molded plastic. Each of the two separate halves 383a, 383b, can include features for capturing and aligning collimating horns 328 and LED circuit board 326a. The light engine enclosure 383 includes feature at the horn output end to capture a thin light transmissive plate 316a, which can help keep foreign objects and debris out of the horns and off of the LEDs. Optical films and other structures can optionally be added to this plate to modify the light engine output; in some cases, for example, light-absorbing materials could be applied to this plate to adjust the light-emitting aperture. In one particular embodiment, light-absorbing films along the outer edges of the side of the plate facing the horns can be used to filter out some of the high-angle light rays and tighten the angular distribution of the output. Complimentary specularly reflective films can also be applied to the cavity-facing side of the plate to prevent absorption of light traveling within the cavity. Refractive optics, color filters, polarizers, down-converters (such as phosphors, fluorescent dyes, or quantum dots), and other optical elements could be applied to this plate achieve various desired effects.

A heat sink plate 385 can be located on the back side of the LED board. The heat sink plate 385 can be fabricated using any known heat exchanger material such as aluminum. Screws inserted through the LED circuit board 326a (from the front side) secure the board to the heat sink plate 385. The heat sink plate 385 can then be secured to the luminaire element 301, 301', using these same screws. A variety of thermal interface materials may be used between the LED circuit board 326a, heat sink plate 385, and luminaire element 301, 301' to enhance heat conduction across these interfaces. For example, a thermally-conductive epoxy (such as 3M TC-2810) could be used between the LED circuit board 326a and heat sink plate 385. In some embodiments, a thermal grease, or a silicone- or acrylic-based thermal pad could be used between the heat sink plate and the system enclosure. This arrangement not only provides a good thermal path from the main heat generating parts (LEDs and driver components), but also mechanically secures the light engine 321 to the luminaire element 301, 301'.

With the light engine enclosure 383 and collimating horns 328 made out of non-conducting plastic materials, the bulk of the light engine (with the exception of the printed circuit board and heat sink plate) can be transparent to radio frequency (RF) signals. As a result, in some cases the microcontroller/antenna board could be more closely integrated with the light engine, for example mounted on one side, with a mating connector (no cable harness required).

In one particular embodiment, other applications for the luminaire element, beyond fixed crosswalk bollard installations, include, for example: bicycle or other pathway application, orienting bollard fixtures nearly parallel to the path to illuminate the ground and ground-level objects; vehicle-mounted lights, e.g. for school buses or other vehicles where enhanced safety of incoming or outgoing passengers is desired; portable fixtures for special events and other temporary uses, for example some designs could incorporate collapsible or inflatable optical cavities; and portable task lights, where a narrow light beam is desirable (e.g. camp site).

In some cases, other variations for the luminaire element include: mix different color LEDs in the same or different horns for color/spectrum control/enhancement, RBG+ schemes—static for color configuration, dynamic for information/emergency; pedestrian and or car counter; additional indicator/blinking light(s) synchronized with main pedestrian crossing light; talking bollard audible feedback, such as "wait" or "safe to cross", to alert pedestrians of safe walking conditions; integrated transmitting beacon to push information or notifications to nearby smartphones or other mobile devices; wireless communication with the bollard for configuration interface (in addition to or instead of current microcontroller switches); data tracking and/or gathering: e.g. syncronize via web server/cloud, sync to wireless radio in car; the exterior of the bollard could be covered with retroreflective sheeting to increase its visibility to oncoming traffic; pedestrian awareness on/off instead of manual push button (IR or ultrasonic motion detector, laser trip wire); integrated weather observatory hub with thermal, barometric, and humidity sensors for localized weather conditions; directional high-gain antenna design using the metal cavity of the bollard; wireless data extraction/programming via handheld device (phone, tablet, custom); emergency mode—including flashes (colored or not) when emergency vehicle approaches; doppler radar for traffic speed information; and attached advertisement or electronic advertisement display on the sides.

The communication between bollard luminaires includes a custom protocol to highlight assurance of signal arrival and light synchronization between bollards in a network. Each of the bollards are assigned unique ID numbers (e.g., a 32-bit ID, allowing over 9 billion possible IDs). Each of the bollards self-join networks having the same group ID (GID), and are assigned a local bollard ID (BID) for network routing. A five-stage algorithmic approach is used to increase successful message passage, including a system of message-acknowledgement to control network flow. Further, message encryption and white-noise modulation ensures security and better performance in compliance with governmental guidelines.

Each of the bollards can self-join networks that have the same GID by "pinging" other bollards with the same GID for network joining. This includes the steps of powering up, setting an ID, sending a "request to join" message, and waiting a fixed time period (e.g., 10 seconds) for an "accept" message. If the "accept" message received, a localized BID is set and an acknowledgement (ACK) is sent to indicate that the network has been joined. If no "accept" message is received, the "request to join" message can be resent. Each of the bollards remains synchronized in button presses, even if not network-joined, although routing can be limited without an assigned network, as described elsewhere.

In some cases, obstacles such as cars, pedestrians, animals and the like that are in the crosswalk zone can impede or block directional signals sent between bollards. For at least these reasons, routing and echoing techniques can be used to pass messages around obstacles. The use of the high-gain antenna provides for an increased number of signal bounces from the ground or other obstacles for better routing capability. For example, in some cases, it may be desirable to address an adjacent bollard on the same side of a roadway by echoing a signal from a bollard on the opposite side of the roadway.

A method of communicating and controlling bollard luminaires in an illuminated crosswalk can have a five step routing process, including: sending a general broadcast message to all bollards with the same group GID; each bollard that receives the message echoes it in the network; attempts are made to route message to bollards who have not responded; attempt to directly address bollards who have not responded by repeatedly messaging them; and sending one final "ping" message in the network, having the bollards resynchronize their respective timing and states, and echo the message in the network.

In some cases, the control of the bollard luminaires in an illuminated crosswalk can include features that can, for example, detect the presence of people and light the walkway when they are near so that they can have good visibility when crossing the street; detect the presence of vehicles and light the walkway when there are no vehicles detected, to indicate to pedestrians that it is safe to cross; and turn off the light when there are no people or vehicles in the area, as the light is not giving anyone any benefit when no one is present, and that energy could be saved instead.

In one particular embodiment, a control system can detect the presence of vehicles and change the light output to provide feedback to the drivers or to the walkers. Several actions can result if the vehicle can be detected, and there are several ways to detect the vehicle. In some cases, a similar system that is used in vehicles for adaptive speed control, or reversing detection to determine if a vehicle is present, or by utilizing a DSRC radio signal to detect the approach of a vehicle can be utilized. Once a vehicle has been detected, several different approaches can be used to communicate with the pedestrian and/or vehicle. In some cases, the light could be disabled in the walk-way to indicate that it is not safe to cross, or instead the light could go on to indicate that there is someone in the walk way and the vehicle needs to stop. In some cases, an indicator light can be directed at the vehicles and can shine a color (e.g., red) and/or flash to indicate that there is someone in the crosswalk, while the main light may still illuminate the pedestrian.

In one particular embodiment, the system may detect the presence of walkers (i.e., pedestrians in motion). This may eliminate the need for a person to activate the luminaire (e.g., by pressing the walk button) when they approach the crosswalk. It also may gives the system a chance to turn on the lights if they are off, or assess the safety of the crosswalk before giving the walk signal to the person without the person manually initializing the system. This may aid in compliance with the system, because no input is required by the user. It can also enable feedback to the system based on a persons' movement, which is not possible if the system requires a button press or other physical activation, in order to initialize.

In one particular embodiment, the system may include turning off the lights when no one is around. This concept may use accurate environmental sensing in order to be implemented successfully; a non-trivial action. For example, if a vehicle presence and a person presence are known, the lighting can be disabled when no one is around. This may also require a fast response lighting system, which traditional street lights do not meet as they take a long time to come on and go off. This light disabling/enabling system can result in energy savings by only lighting the crosswalk when the system network indicates the requirements are met.

In some embodiments, the lighting element has two PCBAs: the LED and LED drivers are contained on one board (Board 1), and the microcontroller and RF transceiver are located on the other board (Board 2), and the two boards are connected by a wiring harness or board-to-board connector. The LED board can operate independently for versions of the lighting element where no wireless control or timing sequences are required, or it can operate with a controller board for versions of the element that require these additional features. The elements can be assembled with upgraded versions of the controller board to provide useful features, including pedestrian counting, solar panel charging, cellular modems (for communication to a central server), ambient light sensing, weather reporting, asset tracking, and vehicle detection. In some cases, the board can be upgraded to include video screens or a user interface (either wireless or physical).

In some cases, the bollard can be provided with hardware and software to enable communication from the bollard to and/or from a server or other computer for the purpose of data gathering. For example, a bollard luminaire can include a communication link to a central server and/or cloud connectivity for relaying data. The communication link can be, for example, a cellular modem, a wi-fi, or any other IEEE 802.x standard device; and the data communicated may be usage statistics uploaded from the bollard luminaire to the central server for aggregation and analysis. In some cases, the data communicated can be web scraped data (e.g., weather, sporting events, concerts, construction information, and the like) downloaded from the cloud and/or central server to the bollard luminaire in order to improve local performance.

The electronics generally are operated using a 12 volt DC voltage—a very common power supply voltage, which can allow installers to use one of many different, inexpensive power supplies to power the lighting element (if using an on-grid supply), or to use a commonly available 12 volt battery (if used in an off-grid application).

In some embodiments, the transceiver uses a highly-directional patch antenna to direct communication out of the metal enclosure and to bollard luminaires located perpendicularly to the face of the lighting element. The resulting antenna provides for a directional, high isotropic gain, which is useful to extend a signal across wide roadways. Typical antennas provide an omnidirectional output and spread power in all directions, thus providing less signal strength in any one direction than the directional antenna. In some cases, the RF system incorporates the metallic enclosure as a ground plane to boost the transceiver's sensitivity to incoming signals.

The routing algorithms used in the communication between lighting elements can increase the communication success rate from <65% without the routing algorithm to >99% with the algorithm. This can be useful in a public or industrial setting, where obstacles (people, objects) prevent line-of-sight communication between lighting elements.

EXAMPLES

A bollard luminaire similar to that shown in FIG. 2D was designed to provide vertical illumination of pedestrians in crosswalks as shown in FIG. 1. The bollard luminaire enclosure measured 4 feet (1.22 m) in height and had a light output region that measured 3 feet (91 cm) in height by 6 inches (15 cm) in width located at the top of the bollard luminaire enclosure. The crosswalk length "L" was 24 feet (7.32 m), the illumination height "H" was 4 feet (1.22 m), the illumination width "W" was 8 feet (2.44 m), and the curb (20) height was 1 foot (61 cm). The light source measured 8 inches (20 cm) in height and 2 inches (5 cm) in width, and held three collimating horns, each collimating horn measuring 8 inches (20 cm) long, 2 inches (5 cm) square at the outlet aperture, and ⅓ of an inch (0.85 cm) square at the inlet aperture, resulting in a collimation half-angle of about 9.6 degrees.

Each horn used a single LED located at the inlet aperture, and the performance was simulated using a Cree XT-E white LED, rated at 130 lumens/watt (available from Cree Inc., Morrisville, N.C.). The light duct cavity was hollow and lined with ESR, and the light output region had uniform perforations in the ESR, providing a 70% open area. Light exiting the perforations encountered an asymmetric-prism asymmetric turning film, a steering film, and a rigid light transmissive support member (polycarbonate plate). The asymmetric-prism turning film was required to turn both upward- and downward-directed light passing through the ESR perforations to an angle somewhat below horizontal, and included a 37 degrees vertex angle proximate the light source, and a 35 degree vertex angle proximate the opposing end, as described in FIG. 2C. The steering film was designed to provide an approximately 9.5 degree steering angle β as shown in FIG. 2F, so that the crosswalk was illuminated without having to rotate the bollard luminaire relative to the crosswalk.

A simulation was run to determine the light flux using conventional ray-tracing software. The simulation considered the light output area divided into three equal portions, and considered light propagating from the light source to the opposing end (segment 1, 2, and 3, in order from the light source) and the light having reflected from the opposing end and propagating back toward the light source (segment 4, 5, 6 in order from the opposing end). Results of the simulation are shown in Table 1.

TABLE 1

Extracted and Propagating Light Flux from Luminaire

| Segment | Incident Flux Normalized to Segment 1 | Extracted Flux Normalized to Segment 1 Input | Total Extracted Flux Normalized to Segment 1 Input |
| --- | --- | --- | --- |
| 1 | 1.000 | 0.176 | 0.224 (Segment 1 + 6) |
| 2 | 0.819 | 0.165 | 0.224 (Segment 2 + 5) |
| 3 | 0.652 | 0.103 | 0.185 (Segment 3 + 4) |
| 4 | 0.548 | 0.082 | |
| 5 | 0.466 | 0.059 | |
| 6 | 0.407 | 0.048 | |
| Residual Back to LED | 0.361 | | |

The light flux on the crosswalk from a pair of luminaires positioned on the same curb (20) as shown in FIG. 1, was simulated using the above inputs, to provide values for the vertical luminance, pedestrian glare, and driver glare. About 1 foot-candle illumination was produced in the illumination region throughout the crosswalk for each of the 12 LEDs being operated at the 130 lumen/watt level (about 0.4 watts/LED), which resulted in about 5 watts total for the four luminaires shown in FIG. 1. Each LED can be reliably operated at about 2 watts/LED, resulting in a minimum vertical illuminance was about 5 foot-candles at this level. The uniformity within the illumination region was about 4:1, so the maximum vertical illuminance was about 4 foot-candles at 0.4 watts/LED, and about 20 foot-candles at 2 watts/LED. The pedestrian glare was calculated to be less than 1000 nits, and considered the total brightness at about 18 inches (45.7 cm) above the illumination region height "H" of 4 feet (1.22 m)—considered to be average adult pedestrian eye-level. The maximum brightness perceived by a child (i.e., within the illumination region) was about 17,000 nits. The driver glare, for approach from any direction perpendicular to the crosswalk, was calculated to be about 65 nits.

Following are a list of embodiments of the present disclosure.

Item 1 is a method for making a luminaire, comprising: forming an enclosure having an enclosure output surface disposed along a longitudinal axis of the enclosure, the enclosure output surface surrounded by a flange; affixing a light engine assembly within the enclosure; affixing electronic circuitry within the enclosure; positioning a reflective light duct to accept light from the light engine, the reflective light duct having a light output region adjacent the enclosure output surface; positioning a light transmissive plate adjacent the enclosure output surface; and affixing the light transmissive plate to the flange.

Item 2 is the method of item 1, wherein the electronic circuitry comprises a printed circuit board capable of communication with the light engine and an external control source.

Item 3 is the method of item 1 or item 2, further comprising affixing the enclosure within a protective housing.

Item 4 is the method of item 1 to item 3, wherein the protective housing comprises a metal shell that is an extended ground plane to increase signal propagation distance from a high-gain directional patch antenna.

Item 5 is the method of item 1 to item 4, further comprising positioning at least one microstructured optical film adjacent the light output region.

Item 6 is the method of item 5, wherein the at least one microstructured optical film comprises a turning film, a steering film, or a combination thereof.

Item 7 is the method of item 1 to item 6, further comprising positioning at least one of a light-absorbing film, a specularly reflective film, a refractive optical structure, a color filter, a polarizer, a down-converter, an illuminated logo, or other graphic adjacent the light output region.

Item 8 is the method of item 1 to item 7, wherein the light output region comprises a reflective film having a plurality of voids.

Item 9 is the method of item 1 to item 8, wherein the enclosure comprises a metal, a plastic, or a composite.

Item 10 is the method of item 9, wherein the metal is selected from aluminum, tin, or steel.

Item 11 is the method of item 1 to item 10, wherein the reflective light duct comprises a metal, a plastic, or a composite.

Item 12 is the method of item 1 to item 11, wherein the reflective light duct comprises a polymeric multilayer reflector film such as Enhanced Specular Reflective (ESR) film.

Item 13 is the method of item 1 to item 12, wherein the light engine comprises a plurality of light collimating horns.

Item 14 is the method of item 13, wherein each of the plurality of light collimating horns are fabricated from a folded ESR-clad sheet.

Item 15 is the method of item 14, wherein the ESR-clad sheet comprises aluminum or polystyrene.

Item 16 is the method of item 13 to item 15, wherein each of the plurality of light collimating horns comprises a light emitting diode (LED) disposed to inject light into the light collimating horn.

Item 17 is the method of item 1 to item 16, further comprising an opening in the enclosure to provide access to switches for setting a control option including setting a light level, an ON time after activation, a wireless master/slave and group identification, an ON/OFF blinking pattern, or a combination thereof.

Item 18 is the method of item 1 to item 17, wherein the reflective light duct comprises a material that is electrically non-conductive and RF transparent.

Item 19 is a light engine, comprising: a housing having a light output aperture and an electrical connection port; a plurality of light collimating horns having an output end adjacent the light output aperture; a light emitting diode (LED) circuit board having at least one LED adjacent an input end of each of the plurality of light collimating horns; a heat sink affixed to the LED circuit board; and a light transmissive plate adjacent the light output aperture.

Item 20 is the light engine of item 19, wherein each of the light collimating horns comprises a sheet of aluminum or plastic having a reflective film surface, the sheet being bent to form the light collimating horn.

Item 21 is the light engine of item 19 or item 20, wherein the light collimating horn comprises a material that is electrically non-conductive and radio-frequency (RF) light transmissive.

Item 22 is the light engine of item 19 to item 21, wherein the light transmissive plate comprises at least one of a light-absorbing film, a specularly reflective film, a refractive optical structure, a color filter, a polarizer, and a down-converter.

Item 23 is the light engine of item 19 to item 22, wherein the LED circuit board comprises more than one driver circuit, each providing power to a subset of the at least one LEDs.

Item 24 is a method of making a light engine, comprising: positioning a light emitting diode (LED) circuit board into a bottom enclosure; affixing a heat-sink to the LED circuit board; folding a reflective material into at least one light collimating horn, each light collimating horn having an input end and an output end; positioning the at least one light collimating horn into the bottom enclosure such that the input end is adjacent an LED mounted on the LED circuit board; disposing a light transmissive plate into the bottom enclosure, adjacent the output end of the at least one light collimating horn; and affixing a top enclosure to the bottom enclosure, thereby enclosing the LED circuit board, a portion of the heat-sink, the at least one light collimating horn, and a portion of the light transmissive plate between the top and bottom enclosures.

Item 25 is the method of item 24, wherein each of the at least one light collimating horns include at least one tab disposed within at least one slot to maintain a shape of the at least one light collimating horn.

Item 26 is a method for crosswalk illumination, comprising: activating a first luminaire in a network of luminaires; broadcasting an activation signal from the first luminaire; sending an echo signal from adjacent luminaires to the first luminaire; receiving an acknowledgement response from adjacent luminaires; and illuminating a light source in each of the network of luminaires.

Item 27 is the method of item 26, wherein the steps of broadcasting the activation signal and sending echo signals are repeated while awaiting the acknowledgement response from adjacent luminaires.

Item 28 is the method of item 26 or item 27, wherein the steps are repeated a predetermined number of times.

Item 29 is the method of item 26 to item 28, wherein the step of illuminating the light source in each of the network of luminaires comprises receiving a time synchronization signal from the network.

Item 30 is the method of item 26 to item 29, wherein the step of activating the first luminaire comprises pushing a button, switching a switch, or activating a proximity sensor.

Item 31 is a method for communication between bollard luminaires, comprising: joining a plurality of bollard luminaires into a network; broadcasting an activation signal from a first bollard luminaire; receiving the activation signal by adjacent bollard luminaires; echoing an acknowledgement signal from a verified network activation signal; and illuminating a light source in each of the plurality of bollard luminaires.

Item 32 is the method of item 31, wherein echoing an acknowledgement signal further comprises: setting a timer; awaiting a synchronizing signal from the network; and receiving the synchronizing signal from the network.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of specific embodiments discussed herein. Therefore, it is intended that this disclosure be limited only by the claims and the equivalents thereof.

What is claimed is:

1. A method for making a luminaire, comprising:
   forming an enclosure having an enclosure output surface disposed along a longitudinal axis of the enclosure, the enclosure output surface surrounded by a flange;
   affixing a light engine assembly within the enclosure, the light engine assembly comprising a plurality of light collimating horns, each light collimating horn fabricated from a sheet comprising a polymeric multilayer reflective film;
   affixing electronic circuitry within the enclosure;
   positioning a reflective light duct to accept light from the light engine assembly, the reflective light duct having a light output region adjacent the enclosure output surface;
   positioning a light transmissive plate adjacent the enclosure output surface; and
   affixing the light transmissive plate to the flange.

2. The method of claim 1, wherein the electronic circuitry comprises a printed circuit board capable of communication with the light engine assembly and an external control source.

3. The method of claim 1, further comprising affixing the enclosure within a protective housing, wherein the protective housing comprises a metal shell that is an extended ground plane to increase signal propagation distance from a high-gain directional patch antenna.

4. The method of claim 1, further comprising positioning at least one microstructured optical film adjacent the light output region, wherein the at least one microstructured optical film comprises a turning film, a steering film, or a combination thereof.

5. The method of claim 1, further comprising positioning at least one of a light-absorbing film, a specularly reflective film, a refractive optical structure, a color filter, a polarizer, a down-converter, an illuminated logo, or other graphic adjacent the light output region.

6. The method of claim 1, wherein the light output region comprises a reflective film having a plurality of voids.

7. The method of claim 1, wherein the reflective light duct comprises a polymeric multilayer reflector film such as Enhanced Specular Reflective (ESR) film.

8. The method of claim 1, wherein the sheet comprising the polymeric multilayer reflective film is a folded ESR-clad sheet.

9. The method of claim 1, wherein each of the plurality of light collimating horns comprises a light emitting diode (LED) disposed to inject light into the light collimating horn.

10. The method of claim 1, wherein the reflective light duct comprises a material that is electrically non-conductive and RF transparent.

11. A light engine, comprising:
    a housing having a light output aperture and an electrical connection port;
    a plurality of light collimating horns having an output end adjacent the light output aperture, each light collimating horn fabricated from a sheet comprising a polymeric multilayer reflective film;
    a light emitting diode (LED) circuit board having at least one LED adjacent an input end of each of the plurality of light collimating horns;
    a heat sink affixed to the LED circuit board; and
    a light transmissive plate adjacent the light output aperture.

12. The light engine of claim 11, wherein the sheet comprises a plastic clad with the polymeric multilayer reflective film, the sheet being bent to form the light collimating horn.

13. The light engine of claim 11, wherein the light collimating horn comprises a material that is electrically non-conductive and RF transparent.

14. The light engine of claim 11, wherein the light transmissive plate comprises at least one of a light-absorbing film, a specularly reflective film, a refractive optical structure, a color filter, a polarizer, and a down-converter.

15. The light engine of claim 11, wherein the LED circuit board comprises more than one driver circuit, each providing power to a subset of the at least one LED.

16. A method of making a light engine, comprising:
    positioning a light emitting diode (LED) circuit board into a bottom enclosure;
    affixing a heat-sink to the LED circuit board;
    folding a reflective material into at least one light collimating horn, each light collimating horn having an input end and an output end, each light collimating horn fabricated from a sheet comprising a polymeric multilayer reflective film;
    positioning the at least one light collimating horn into the bottom enclosure such that the input end is adjacent an LED mounted on the LED circuit board;
    disposing a light transmissive plate into the bottom enclosure, adjacent the output end of the at least one light collimating horn; and
    affixing a top enclosure to the bottom enclosure, thereby enclosing the LED circuit board, a portion of the heat-sink, the at least one light collimating horn, and a portion of the light transmissive plate between the top and bottom enclosures.

17. A method for crosswalk illumination, comprising:
    activating a first luminaire in a network of luminaires;
    broadcasting an activation signal from the first luminaire;
    sending an echo signal from adjacent luminaires to the first luminaire;
    receiving an acknowledgement response from adjacent luminaires; and
    illuminating a light source in each of the network of luminaires.

18. The method of claim 17, wherein the step of illuminating the light source in each of the network of luminaires comprises receiving a time synchronization signal from the network.

19. A method for communication between bollard luminaires, comprising:
    joining a plurality of bollard luminaires into a network;
    broadcasting an activation signal from a first bollard luminaire;
    receiving the activation signal by adjacent bollard luminaires;
    echoing an acknowledgement signal from a verified network activation signal; and
    illuminating a light source in each of the plurality of bollard luminaires.

20. The method of claim 19, wherein echoing an acknowledgement signal further comprises:
    setting a timer;
    awaiting a synchronizing signal from the network; and
    receiving the synchronizing signal from the network.

* * * * *